(12) United States Patent
Yang

(10) Patent No.: US 7,580,098 B2
(45) Date of Patent: Aug. 25, 2009

(54) DISPLAY DEVICE

(75) Inventor: Young-Chol Yang, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 556 days.

(21) Appl. No.: 11/420,903

(22) Filed: May 30, 2006

(65) Prior Publication Data

US 2006/0274238 A1 Dec. 7, 2006

(30) Foreign Application Priority Data

Jun. 2, 2005 (KR) ........................ 10-2005-0047175

(51) Int. Cl.
*G02F 1/1335* (2006.01)
(52) U.S. Cl. .................... 349/115; 349/96; 349/106; 349/114; 349/117
(58) Field of Classification Search .................. 349/96, 349/105–106, 113–115, 117
See application file for complete search history.

(56) References Cited

U.S. PATENT DOCUMENTS

| | | | |
|---|---|---|---|
| 6,621,543 B2 * | 9/2003 | Moon .......................... | 349/115 |
| 6,765,639 B2 | 7/2004 | Maeda | |
| 6,833,892 B2 | 12/2004 | Kamijo | |
| 2003/0076466 A1 | 4/2003 | Ozawa et al. | |

FOREIGN PATENT DOCUMENTS

| | | |
|---|---|---|
| JP | 2003-262864 | 9/2003 |
| JP | 2003-279968 | 10/2003 |
| JP | 2003-307726 | 10/2003 |
| JP | 2004-101614 | 4/2004 |
| JP | 2004-145097 | 5/2004 |
| JP | 2004-326128 | 11/2004 |
| KR | 2001-0045449 | 6/2001 |
| KR | 2001-0068465 | 7/2001 |
| KR | 2001-0107317 | 12/2001 |
| KR | 2002-0010747 | 2/2002 |
| KR | 2003-0033983 | 5/2003 |
| KR | 2003-0033987 | 5/2003 |
| KR | 2003-0033990 | 5/2003 |
| KR | 2003-0034010 | 5/2003 |
| KR | 2004-0011868 | 2/2004 |
| KR | 2004-0052451 | 6/2004 |

* cited by examiner

*Primary Examiner*—Frank G Font
*Assistant Examiner*—Michael P Mooney
(74) *Attorney, Agent, or Firm*—F. Chau & Associates, LLC

(57) ABSTRACT

A phase-invariant layer, which is formed at areas that are not transmission areas, forces light entering the reflection areas of a transflective LCD from a backlight unit to move into transmission areas by reflection, so that the amount of light used in a transmission mode is increased. In this way, light utilization efficiency and display luminance of the LCD are improved.

33 Claims, 10 Drawing Sheets

DISPLAY DEVICE

BACKGROUND OF THE INVENTION (a) Field of the Invention

The present invention relates to a transflective (transmissive-reflective) liquid crystal display (LCD).

(b) Description of the Related Art

Generally, an LCD includes a pair of panels individually having electrodes on their inner surfaces, and a dielectric anisotropy liquid crystal (LC) layer interposed between the panels. In an LCD, a variation of the voltage difference between the field generating electrodes, i.e., a variation in the strength of an electric field generated by the electrodes, changes the transmittance of the light passing through the LCD, and thus desired images are obtained by controlling the voltage difference between the electrodes.

Depending on the kinds of light source used for image display, LCDs are divided into three types: transmissive, reflective, and transflective (transmissive-reflective). In transmissive LCDs, pixels are illuminated from behind using a backlight. In reflective LCDs, the pixels are illuminated from the front using incident light originating from the ambient environment. The transflective LCDs combine transmissive and reflective characteristics. Under medium light conditions such as an indoor environment, or under complete darkness conditions, these LCDs are operated in a transmissive mode, while under very bright conditions, such as an outdoor environment, they are operated in a reflective mode.

In the transflective LCDs, two absorbing polarizers, each of which is a film obtained by adding iodine molecules or bichromatic dyes to stretched PVA, are individually attached to the outer surfaces of the panels. The absorbing polarizers exhibit some unique optical characteristics. In detail, they allow only P-waves of incident light to pass, and absorb S-waves. Theoretically, an absorbing polarizer transmits 50% of the incident light and absorbs the remaining 50%. Practically, however, the absorbing polarizer transmits only 43% to 45% due to a light loss occurring at its surface.

In a transflective LCD, there are transmission areas and reflection areas. Light entering the reflection areas of the LCD from a backlight unit is returned toward the backlight unit by reflection at reflective electrodes. At this time, most of the light is removed by absorption at the absorbing polarizer.

Due to such an absorption light loss, light efficiency and display luminance of the LCD are less than optimal.

SUMMARY OF THE INVENTION

The present invention improves display luminance of a transflective LCD operating in a transmission mode by enhancing utilization efficiency of light that is supplied from a backlight unit in a transmission mode.

According to an aspect of the present invention, there is provided a display device including a transmission area and a reflection area, which includes a first substrate, a phase-invariant layer that is formed on the first substrate and reflects light while causing no change in the polarization state of the light, a transparent electrode formed on the first substrate, a reflective electrode formed on a portion of the transparent electrode, a second substrate that is opposite to the first substrate, an LC layer interposed between the first substrate and the second substrate, a first optical retarder and a second optical retarder each being attached to a respective outer surface of the first and second substrates, and a first polarizer and a second polarizer each being individually attached to a respective outer surface of the first and second optical retarders.

Here, the reflection area is an area disposed on and under the reflective electrode, while the transmission area is an area disposed on and under the partial transparent electrode without the reflective electrode thereon.

The phase-invariant layer is formed only at the reflection area, and may be formed of cholesteric LC. The phase-invariant layer may be a wide-band cholesteric LC layer in which the pitch of the molecular helix varies with its position along the phase-invariant layer. The phase-invariant layer may have a multi-layered structure including at least two cholesteric LC layers each having an uniform pitch. The phase-invariant layer may have a triple-layered structure including three cholesteric LC layers each having an uniform pitch. In this case, the three cholesteric LC layers may selectively reflect and transmit red light, green light, and blue light, respectively.

Transmission axes of the first polarizer and the second polarizer may be mutually crossed at a right angle.

Each of the first optical retarder and the second optical retarder has a slow axis and a fast axis, and the axes may be formed at ±45° to the transmission axes of the first and second polarizers. Each of the first optical retarder and the second optical retarder may be a quarter-wave phase retardation film.

The display device may further include an optical isotropy layer that is formed at the same layer as the phase-invariant layer without an overlap portion therebetween.

The display device may further include a backlight unit that is provided under the first substrate to supply light to the liquid crystal display, and a reflection plate that is disposed on a lower surface of the backlight unit.

According to another aspect of the present invention, there is provided a display device including a transmission area and a reflection area, which includes a first substrate, a phase-invariant layer that is formed on the first substrate and reflects light while causing no change in the polarization state of the light, a transparent electrode formed on the first substrate, a reflective electrode formed on a portion of the transparent electrode, a second substrate that is opposite to the first substrate, an LC layer interposed between the first substrate and the second substrate, an optical retarder that is attached to the outer surface of the second substrate, a polarizer that is attached to the outer surface of the optical retarder, and a selective reflection layer that is attached to the outer surface of the first substrate and transmits a component that is polarized in a first direction of incident light, while reflecting a component that is polarized in a second direction.

Here, the reflection area is an area disposed on and under the reflective electrode, while the transmission area is an area disposed on and under the partial transparent electrode without the reflective electrode thereon.

The phase-invariant layer is formed only at the reflection area, and may be formed of cholesteric LC. The phase-invariant layer may be a wide-band cholesteric LC layer in which the pitch of the molecular helix varies with its position along the phase-invariant layer. The phase-invariant layer may have a multi-layered structure including at least two cholesteric LC layers each having an uniform pitch. The phase-invariant layer may have a triple-layered structure including three cholesteric LC layers each having an uniform molecular pitches. In this case, the three cholesteric LC layers may selectively reflect and transmit red light, green light, and blue light, respectively.

The polarizer has a transmission axis and the optical retarder has a fast axis and a slow axis. The fast axis and the slow axis of the optical retarder may be formed at ±45° to the transmission axis of the polarizer.

The optical retarder may be a quarter-wave phase retardation film.

The display device may further include an optical isotropy layer that is formed at the same layer as the phase-invariant layer without an overlap portion therebetween.

The display device may further include a backlight unit that is provided under the first substrate to supply light to the liquid crystal display, and a reflection plate that is disposed on a lower surface of the backlight unit.

The selective reflection layer may be formed of cholesteric LC. The selective reflection layer may be a wide-band cholesteric LC layer in which the pitch of the molecular helix varies with its position along the selective reflection layer. The selective reflection layer may have a multi-layered structure including at least two cholesteric LC layers each having an uniform pitch. The selective reflection layer may have a triple-layered structure including three cholesteric liquid crystal layers each having an uniform pitch. In this case, the three cholesteric LC layers may selectively reflect and transmit red light, green light, and blue light, respectively.

According to still another aspect of the present invention, there is provided a display device including a transmission area and a reflection area, which includes a first substrate, a phase-invariant layer that is formed on the first substrate and reflects light that is polarized in a first direction while causing no change in the polarization state of the light, a transparent electrode formed on the first substrate, a reflective electrode formed on a portion of the transparent electrode, a second substrate that is opposite to the first substrate, an LC layer interposed between the first substrate and the second substrate, a first optical retarder that is attached to the outer surface of the second substrate, and a first polarizer that is attached to the outer surface of the optical retarder.

Here, the reflection area is an area disposed on and under the reflective electrode, while the transmission area is an area disposed on and under the partial transparent electrode without the reflective electrode thereon.

The phase-invariant layer is formed at the reflection area and is supplied with light that is polarized in the first direction.

The display device may further include a second optical retarder and a second polarizer that are attached to the outer surface of the first substrate in that order, and that enable the light that is polarized in the specific direction to be incident onto the phase-invariant layer.

The display device may further include a selective reflection layer, which is attached to the outer surface of the first substrate, that transmits a component that is polarized in the first direction of incident light and reflects a component that is polarized in a second direction that is opposite to the first direction.

The display device may further include an optical isotropy layer that is formed at the same layer as the phase-invariant layer without an overlap portion therebetween.

The phase-invariant layer may be formed of cholesteric LC. The phase-invariant layer may be a wide-band cholesteric LC layer in which the pitch of molecular helix varies with its position along the phase-invariant layer. The phase-invariant layer may have a multi-layered structure including at least two cholesteric LC layers each having an uniform pitch. The phase-invariant layer may have a triple-layered structure including three cholesteric LC layers each having a uniform pitch. In this case, the three cholesteric LC layers may selectively reflect and transmit red light, green light, and blue light, respectively.

BRIEF DESCRIPTION OF THE DRAWINGS

The above objects and other advantages of the present invention will become more apparent by describing the preferred embodiments thereof in more detail with reference to the accompanying drawings.

DETAILED DESCRIPTION OF THE PREFERRED EMBODIMENTS

Figure 1:
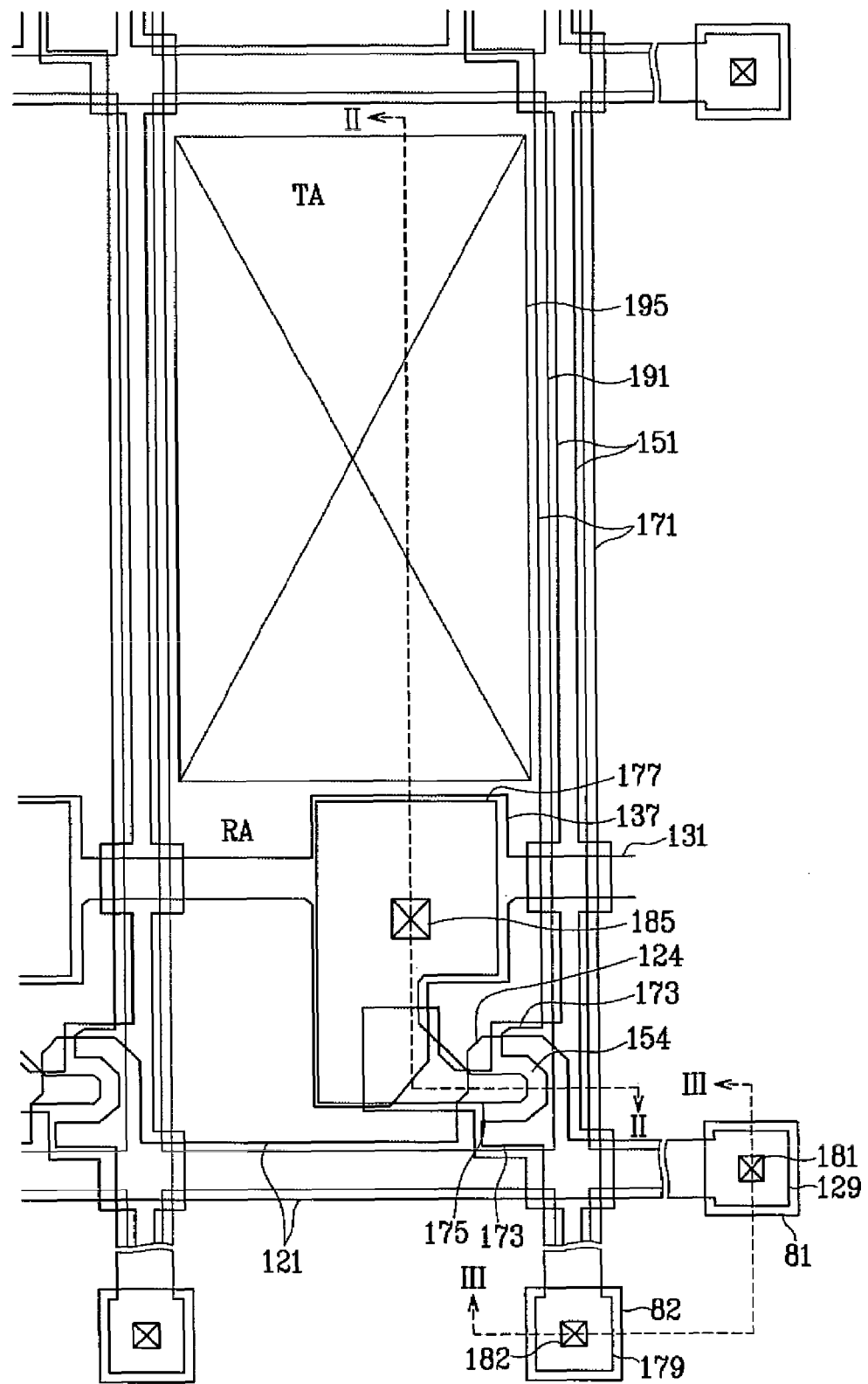
FIG. 1 is a layout view of an LCD according to the first embodiment of the present invention.

Preferred embodiments of the present invention will be described more fully hereinafter with reference to the accompanying drawings, in which preferred embodiments of the invention are shown. The present invention may, however, be embodied in different forms and should not be construed as being limited to the embodiments set forth herein. Rather, these embodiments are provided so that this disclosure will be thorough and complete, and will fully convey the scope of the invention to those skilled in the art.

In the drawings, the thickness of the layers, films, and regions are exaggerated for clarity. Like numerals refer to like elements throughout. It will be understood that when an element such as a layer, film, region, or substrate is referred to as being "on" another element, it can be directly on the other element or intervening elements may also be present.

Hereinafter, an LCD according to the first embodiment of the present invention will be described with reference to FIG. 1 through FIG. 3.

Figure 2:
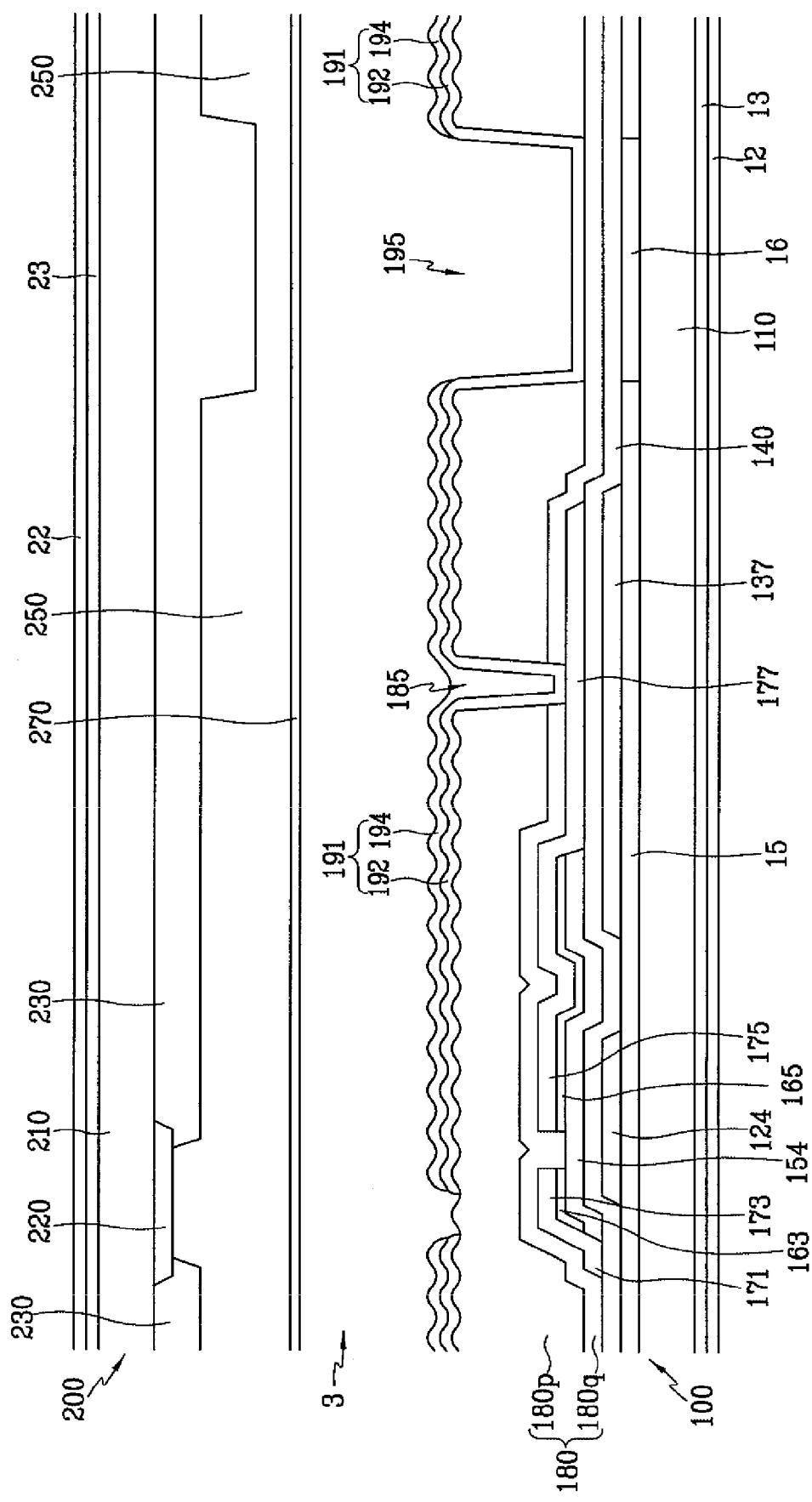
FIG. 2 is a cross-sectional view along a line II-II' of FIG. 1.
Figure 3:
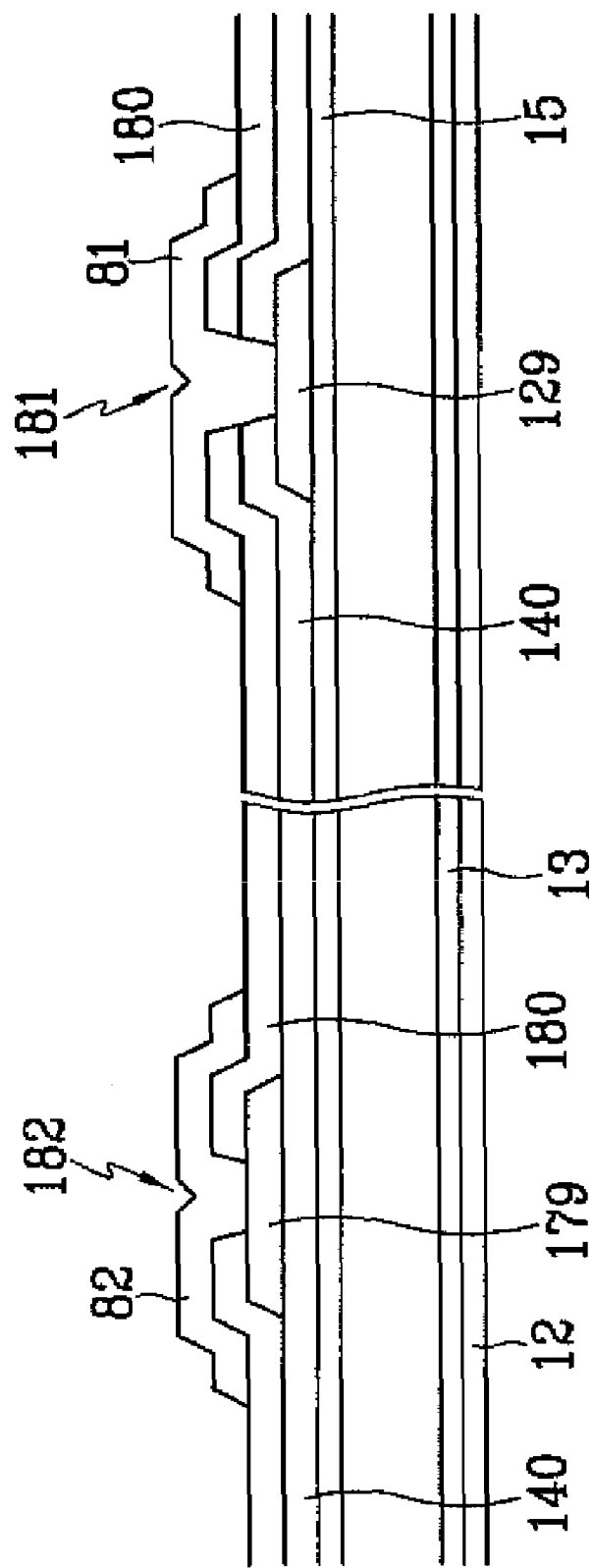
FIG. 3 is a cross-sectional view along a line III-III' of FIG. 1.

FIG. 1 is a layout view of an LCD according to the first embodiment of the present invention, and FIG. 2 and FIG. 3 are cross-sectional views along the lines II-II' and III-III' of FIG. 1, respectively.

Referring to FIG. 1 through FIG. 3, the LCD of this embodiment comprises a TFT array panel 100 and a common electrode panel 200 facing each other, and an LC layer 3 interposed therebetween. LC molecules in the LC layer 3 are aligned perpendicular to or parallel to the surfaces of the two panels 100 and 200.

The TFT array panel 100 is configured as follows.

A phase-invariant layer 15 and an optical isotropy layer 16 are formed on an insulating substrate 110 made of transparent glass or plastic. Here, it is preferably that the phase-invariant layer 15 and the optical isotropy layer 16 are formed at the same layer without an overlap portion therebetween. It is also preferable that the optical isotropy layer 16 is formed at transmission areas TA, while the phase-invariant layer 15 is formed at areas that are not the transmission areas TA, where reflection areas RA are located.

The phase-invariant layer 15 reflects incident light, causing no change in the polarization state of the light. This phase-invariant layer 15 is formed of cholesteric LC with a helical structure. Based on unique optical characteristics of cholesteric LC, the phase-invariant layer 15 transmits circularly polarized light rotating along the helical structure while reflecting circularly polarized light rotating in the opposite direction with respect to the helical structure. When reflecting the light, the phase-invariant layer 15 does not change the polarization state of the light.

Meanwhile, when transmitting light, the optical isotropy layer 16 does not change the polarization state of the light.

In the case that the phase-invariant layer 15 and the optical isotropy layer 16 have different thicknesses from each other, an organic insulating layer (not shown) may be formed on them for planarization of the two layers.

A plurality of gate lines 121 and a plurality of storage electrode lines 131 are formed on the phase-invariant layer 15 and the optical isotropy layer 16.

The gate lines 121 for transmitting gate signals extend substantially in a horizontal direction. Each gate line 121 includes a plurality of gate electrodes 124 protruding upward and an end portion 129 having a relatively large dimension to be connected to a different layer or an external device. A gate driver (not shown) for generating the gate signals may be mounted on a flexible printed circuit (not shown) attached to the substrate 110, or directly on the substrate 110. Otherwise, the gate driver may be integrated into the substrate 110. In this case, the gate lines 121 are directly connected to the gate driver.

The storage electrode lines 131 for receiving a predetermined voltage extend substantially parallel to the gate lines 121. Each storage electrode line 131 is placed between two adjacent gate lines, particularly, closer to the lower-positioned gate line of the two. Each storage electrode line 131 includes a plurality of storage electrodes 137 protruding upward and downward. The form and arrangement of the storage electrode lines 131 may be freely varied.

The gate lines 121 and the storage electrode lines 131 are preferably made of an aluminum— (Al) containing metal such as Al and an Al alloy, a silver— (Ag) containing metal such as Ag and a Ag alloy, a gold— (Au) containing metal such as Au and a Au alloy, a copper— (Cu) containing metal such as Cu and a Cu alloy, a molybdenum— (Mo) containing metal such as Mo and a Mo alloy, chrome (Cr), titanium (Ti), or tantalum (Ta). The gate lines 121 and the storage electrode lines 131 may be configured as a multi-layered structure, in which at least two conductive layers (not shown) having different physical properties are included. In such a structure, one of the two conductive layers is made of a low resistivity metal, such as an Al-containing metal, a Ag-containing metal, a Cu-containing metal, or the like, in order to reduce delay of the signals or voltage drop in the gate lines 121 and the storage electrode lines 131. The other is made of a material having prominent physical, chemical, and electrical contact properties with other materials such as indium tin oxide (ITO), indium zinc oxide (IZO), etc. For example, a Mo-containing metal, Cr, Ta, Ti, etc., may be used for the formation of the same layer. Desirable examples of the combination of the two layers are a lower Cr layer and an upper Al (or Al alloy) layer, and a lower Al (or Al alloy) layer and an upper Mo (or Mo alloy) layer. Besides the above-listed materials, various metals and conductors can be used for the formation of the gate lines 121 and the storage electrode lines 131.

All lateral sides of the gate lines 121 and the storage electrode lines 131 preferably slope in the range from about 30° to 80° relative to the surface of the substrate 110.

A gate insulating layer 140, made of silicon nitride ($SiN_x$) or silicon oxide ($SiO_x$), is formed on the gate lines 121 and the storage electrode lines 131.

A plurality of linear semiconductors 151 made of hydrogenated amorphous silicon (abbreviated as "a-Si") or poly-silicon are formed on the gate insulating layer 140. Each linear semiconductor 151 extends substantially in a vertical direction, and includes a plurality of projections 154 that extend along the respective gate electrodes 124. The linear semiconductors 151 are enlarged in the vicinities of the gate lines 121 and the storage electrode lines 131 to cover them widely.

A plurality of linear ohmic contacts 161 and island-shaped ohmic contacts 165 are formed on the linear semiconductors 151. The ohmic contacts 161 and 165 may be made of N+ hydrogenated amorphous silicon that is highly doped with N-type impurities such as phosphorus (P), or silicide. The linear ohmic contacts 161 include a plurality of projections 163. A set of a projection 163 and an island-shaped ohmic contact 165 is placed on the projection 154 of the semiconductor 151.

All lateral sides of the semiconductors 151 and the ohmic contacts 163 and 165 slope in the range from about 30° to 80° relative to the surface of the substrate 110.

A plurality of data lines 171 and a plurality of drain electrodes 175 are formed on the ohmic contacts 161 and 165 and the gate insulating layer 140.

The data lines 171 for transmitting data signals extend substantially in a vertical direction to be crossed with the gate lines 121 and the storage electrode lines 131. Each data line 171 includes a plurality of source electrodes 173 extending toward the respective gate electrodes 124, and an end portion 179 having a relatively large dimension to be connected to a different layer or an external device. A data driver (not shown) for generating the data signals may be mounted on a flexible printed circuit (not shown) attached to the substrate 110, or directly on the substrate 110. Otherwise, the data driver may be integrated into the substrate 110. In this case, the data lines 171 are directly connected to the gate driver.

The drain electrodes 175 separated from the data lines 171 are opposite to the source electrodes 173, centering on the gate electrodes 124. Each drain electrode 175 includes an expansion 177 having a relatively large dimension and a bar-shaped end portion. The expansions 177 of the drain electrodes 175 are overlapped with the storage electrodes 137 of the storage electrode lines 131, and the bar-shaped end portions are partially surrounded with the curved source electrodes 173.

A gate electrode 124, a source electrode 173, a drain electrode 175, and a projection 154 of the semiconductor 151 form a thin film transistor (TFT). A TFT channel is formed in the projection 154 provided between the source electrode 173 and the drain electrode 175.

The data lines 171 and the drain electrodes 175 are preferably made of a refractory metal such as Mo, Cr, Ta, or Ti, or alloys thereof, and may be configured as multi-layered structures including a refractory metal layer (not shown) and a low resistivity conductive layer (not shown). A desirable example of the multi-layered structure is a lower layer made of one among Cr, Mo, and a Mo alloy, and an upper layer made of Al or an Al alloy. Another example is a lower layer made of Mo or a Mo alloy, an intermediate layer made of Al or an Al alloy, and an upper layer made of Mo or a Mo alloy. Besides the above-listed materials, various metals and conductors can be used for the formation of the data lines 171 and the drain electrodes 175.

All lateral sides of the data lines 171 and the drain electrodes 175 preferably slope in the range from about 30° to 80° relative to the surface of the substrate 110.

The ohmic contacts 161 and 165 exist only between the underlying semiconductors 151 and the overlying data lines 171 and between the overlying drain electrodes 175 and the underlying semiconductors 151, in order to reduce contact resistance therebetween. Most of the linear semiconductors 151 are formed more narrowly than the data lines 171, but portions thereof are enlarged in the vicinities of places to be crossed with the gate lines 121, as previously mentioned, in order to prevent the data lines 171 from being shorted. The linear semiconductors 151 are partially exposed at places where the data lines 171 and the drain electrodes 175 do not cover them, as well as between the source electrodes 173 and the drain electrodes 175.

A passivation layer 180 is formed on the data lines 171, the drain electrodes 175, and the exposed portions of the semiconductors 151. The passivation layer 180 is configured as a double-layered structure including a lower layer 180q made of an inorganic insulator such as $SiN_x$ or $SiO_x$, and an upper layer 180p made of an organic insulator. A desirable organic insulator for the upper passivation layer 180p has a low dielectric constant of below 4.0 and/or photosensitivity. The upper passivation layer 180p is provided with apertures, i.e., transmission windows 195, where the lower passivation layer 180q is partially exposed, and the top surface of the upper passivation layer 180p is uneven. The passivation layer 180 may be configured as a single layer of an inorganic insulator or an organic insulator.

The passivation layer 180 is provided with a plurality of contact holes 182 and 185, through which the end portions 179 of the data lines 171 and the drain electrodes 175 are exposed, respectively. A plurality of contact holes 181 are formed in the passivation layer 180 and the gate insulating layer 140, and the end portions 129 of the gate lines 121 are exposed therethrough.

A plurality of pixel electrodes 191 and a plurality of contact assistants 81 and 82 are formed on the passivation layer 180.

Each pixel electrode 191 has a ripple-shaped profile caused by the uneven top surface of the upper passivation layer 180p, and is comprised of a transparent electrode 192 and a reflective electrode 194 overlying the transparent electrode 192. The transparent electrodes 192 are made of a transparent conductor such as ITO or IZO, and the reflective electrodes 194 are made of an opaque reflectivity conductor such as Al, Cr, Ag, or alloys thereof. The reflective electrodes 194 may be configured as a double-layered structure. In this case, upper layers (not shown) are made of a low resistivity metal such as Al, Ag, a Ag alloy, or the like, and lower layers (not shown) are made of a material having prominent contact properties with ITO and IZO, such as a Mo-containing metal, Cr, Ta, Ti, or the like.

Each reflective electrode 194 is formed on a portion of the transparent electrode 192. Accordingly, the remaining portion the transparent electrode 192 is exposed. At this time, the exposed portion of the transparent electrode 192 is disposed to correspond to the transmission window 195 of the upper passivation layer 180p.

The pixel electrodes 191 are physically and electrically connected to the drain electrodes 175 through the contact holes 185 in order to receive data voltages from the drain electrodes 175. The pixel electrodes 191 are supplied with the data voltages to generate electric fields in cooperation with a common electrode 270 of the common electrode panel 200, determining the orientations of the LC molecules in the LC layer 3 interposed between the two electrodes 191 and 270. According to the orientations of the LC molecules, the polarization of light passing through the LC layer 3 is varied. Each set of the pixel electrode 191 and the common electrode 270 forms an LC capacitor that is capable of storing the applied voltage after the TFT is turned off.

In a transflective LCD, there are transmission areas TA defined by the transparent electrodes 192 and reflection areas RA defined by the reflective electrodes 194. In more detail, a transmission area TA is a section of portions disposed on and under the transmission window 195 in the TFT array panel 100, the common electrode panel 200, and the LC layer 3, while a reflection area RA is a section of portions disposed on and under the reflective electrode 194. As illustrated above, the phase-invariant layer 15 is formed at regions that are not the transmission areas TA, while the optical isotropy layer 16 is formed at the transmission areas TA.

In the transmission areas TA, internal light, supplied from a backlight unit 500 that is provided at the rear of the LCD, successively passes through the TFT array panel 100 and the LC layer 3, and then exits the common electrode panel 200, thus contributing to the display. During these processes, the reflective electrodes 194 reflect a portion of light that is supplied from the backlight unit 500, so that such a portion does not reach the common electrode panel 200. In the present invention, however, all light supplied from the backlight unit 500 exits the common electrode panel 200 by virtue of an internal reflection mechanism, as will be described in more detail below.

In the reflection areas RA, exterior light, supplied through the front of the LCD, successively passes through the common electrode panel 200 and the LC layer 3, and then is reflected by the reflective electrodes 194 of the TFT array panel 100. After the reflection, the exterior light passes through LC layer 3 again, and then exits the common electrode panel 200, thus contributing to the display. The uneven top surfaces of the reflective electrodes 194 disperse the light by reflection, so that images that may be shown on an LCD screen because of mirror reflection are prevented.

The upper passivation layer 180p does not exist at the transmission areas TA. Therefore, the thickness of the LC layer 3 (i.e., a cell gap) relative to the reflection areas RA is twice as large as the thickness of the LC layer 3 relative to the transmission areas TA.

The pixel electrodes 191 and the drain electrodes 175 connected thereto are overlapped with the storage electrodes 137 as well as stem lines of storage electrode lines 131. To enhance the voltage storage ability of the LC capacitors, storage capacitors are further provided. Overlapping of the pixel electrodes 191 and the drain electrodes 175, electrically connected thereto, with the storage electrode lines 131 implements the storage capacitors.

The contact assistants 81 and 82 are connected to the end portions 129 of the gate lines 121 and the end portions 179 of the data lines 171 through the contact holes 181 and 182, respectively. The contact assistants 81 and 82 supplement adhesion between the exposed end portions 129 and 179 and exterior devices, and protect them.

The common electrode panel 200, facing the TFT array panel 100, is configured as follows.

A light-blocking member 220 called "a black matrix" is provided on an insulating substrate 210 made of transparent glass or plastic. The light-blocking member 220 prevents light from leaking out through barriers between the pixel electrodes 190, and defines aperture regions facing the pixel electrodes 191.

A plurality of color filters 230 are formed on the substrate 210. Most of them are placed within the aperture regions delimited by the light-blocking member 220. The color filters 230 may extend along the respective pixel electrodes 191 in a vertical direction. Each color filter 220 may exhibit one among red, green, and blue colors.

Portions of the color filters 230 that are placed at the transmission areas TA and portions of the color filters 230 that are placed at the reflection areas RA have different thicknesses. In general, the transflective LCD exhibits a difference of color tone between the transmission area TA and the reflection area RA. This is because in the transmission areas TA light passing through the transparent electrodes 192 passes through the color filters 230 only once, while in the reflection areas RA light that is incident through the common electrode panel 200 passes through the color filters twice because of reflection at the reflective electrodes 194. To compensate for the difference in color tone, some methods have been used. One method is to form the portions of the color filters 230, which are placed at the transmission areas TA, thicker than the portions of the color filter 230, which are placed at the reflection areas RA. Another method is to form light holes in the color filters 230 that are placed at the reflection areas RA.

An overcoat layer 250 is formed on the light-blocking member 220 and the color filters 230 to remove a step difference occurring between the color filters 230 and the light-blocking member 220.

The common electrode 270, made of a transparent conductive material such as ITO or IZO, is formed on the overcoat layer 250.

Two alignment layers (not shown) are individually formed on the inner surfaces of the two panels 100 and 200 to align the LC molecules in the LC layer 3 in a desired direction.

A lower polarizer 12 and an upper polarizer 22 are individually attached to the outer surfaces of the two panels 100 and 200. Their transmission axes are mutually crossed at a right angle.

A lower optical retarder 13 is formed between the lower polarizer 12 and the lower substrate 110, while an upper optical retarder 23 is formed between the upper polarizer 22 and the upper substrate 210. Each of the two optical retarders 13 and 23 has a slow axis and a fast axis. Accordingly, light passing through the fast axis obtains a faster phase than that of light passing through the slow axis. In this embodiment, a phase difference between the two axes is a quarter-wave to convert circularly polarized light into linearly polarized light or linearly polarized light into circularly polarized light. At this time, it is preferable that the two axes are mutually crossed at a right angle and that they are formed at ±45° to the transmission axes of the polarizers 12 and 22, respectively.

The LC molecules in the LC layer 3 are aligned perpendicular to or parallel to the surfaces of the panels 100 and 200.

A plurality of spacers (not shown) are provided between the two panels 100 and 200 to maintain a uniform cell gap between the two panels 100 and 200 where the LC layer 3 is eventually placed.

To assemble the TFT array panel 100 and the common electrode panel 200, a sealant (not shown) may be applied to the edges of the common electrode panel 200.

Figure 4:
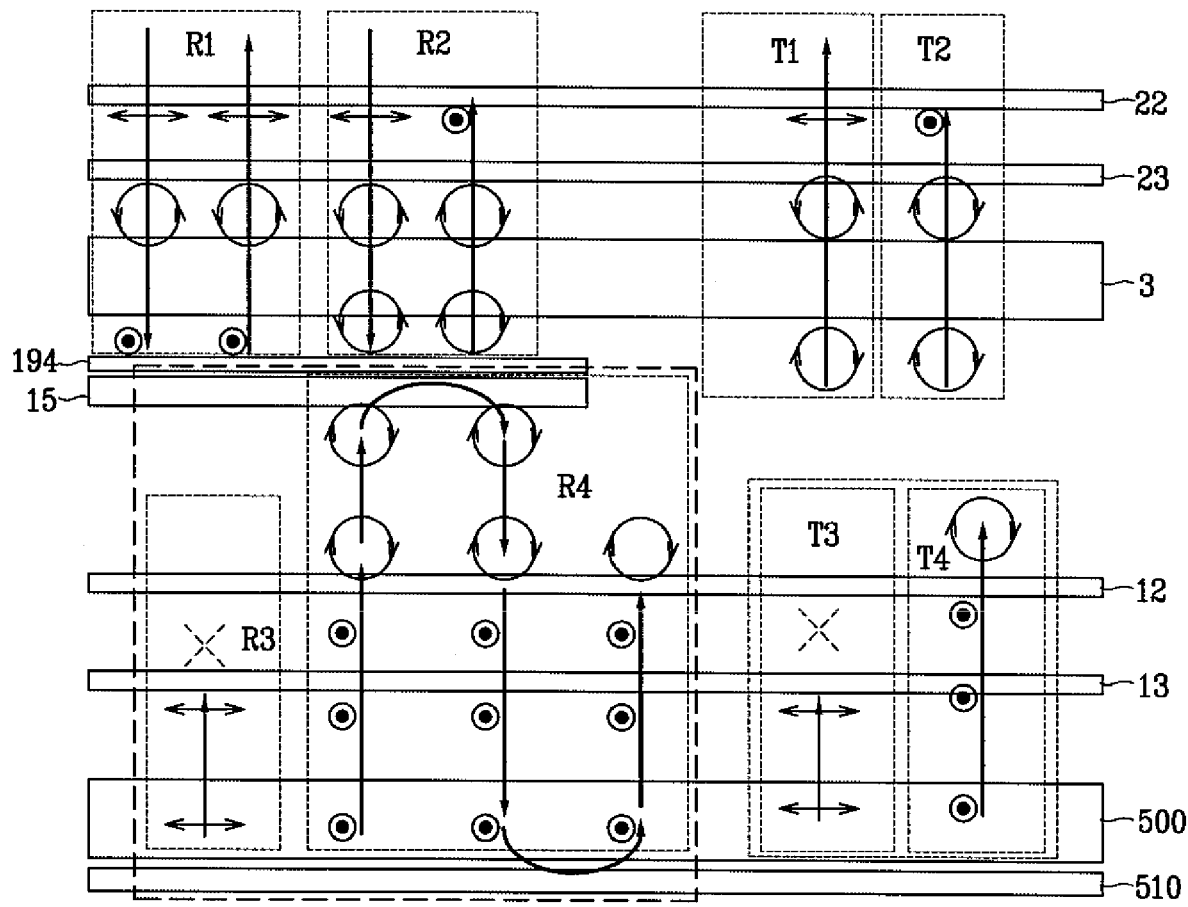
FIG. 4 shows the polarization states of light at a reflection area and a transmission area of the LCD shown in FIG. 1 through FIG. 3.

FIG. 4 shows the polarization states of light at the reflection area RA and the transmission area TA of the LCD shown in FIG. 1 through FIG. 3.

In FIG. 4, the LCD and the backlight unit 500 as an internal light source are illustrated in a simplified form for ease of discussion. A reflection plate 510 is disposed on a lower surface of the backlight unit 500.

FIG. 4 shows only primary components that have influence on the polarization of light in the LCD. Those components include the following: the lower and upper polarizers 12 and 22, the lower and upper optical retarders 13 and 23, the LC layer 3, and the phase-invariant layer 15. The optical isotropy layer 16 is omitted in FIG. 4 since it does not affect the polarization state of light passing therethrough.

The transmission axis of the upper polarizer 22 is in the X direction (↔), while the transmission axis of the lower polarizer 12 is in the Y direction (⊙) that is perpendicular to the X direction. The two polarizers 12 and 22 are both absorbing polarizers that transmit components parallel to their transmission axes and absorb components perpendicular to the axes.

Each of the optical retarders 13 and 23 has the slow axis and the fast axis. Accordingly, light passing through the fast axis obtains a faster phase than that of light passing through the slow axis. In this embodiment, a phase difference between the two axes is a quarter-wave to convert circularly polarized light into linearly polarized light or linearly polarized light into circularly polarized light. At this time, it is preferable that the two axes are mutually crossed at a right angle and that they are formed at ±45° to the transmission axes of the polarizers 12 and 22, respectively.

The phase-invariant layer 15 is a cholesteric LC layer with a helical structure. Based on unique optical characteristics of cholesteric LC, the phase-invariant layer 15 transmits circularly polarized light rotating along the helical structure, and reflects circularly polarized light rotating in the opposite direction to the helical structure. When reflecting light, the phase-invariant layer 15 does not change the polarization state of the light.

Depending on whether the LC layer 3 is supplied with an electric field or not, the polarization state of light passing through the LC layer 3 is maintained or changed. That is, the LC layer 3 with the electric field influences the polarization state of light passing therethrough, while the LC layer 3 without the electric field does not influence the polarization state. In the latter case, since the thickness of the LC layer 3 that is placed at the reflection area RA is half of the thickness of the LC layer 3 placed at the transmission area TA, a phase difference at the reflection area RA becomes a quarter-wave, while it is a half-wave at the transmission area TA. Accordingly, in the reflection area RA, the LC layer 3 without the electric field converts linearly polarized incident light into circularly polarized light and vice versa, while in the transmission area TA the LC layer 3 converts right-handed circularly polarized incident light into left-handed circularly polarized light and vice versa.

Based on the above-mentioned facts, proceeding paths of light entering the reflection area RA of the LCD will be discussed below with reference to FIG. 4.

Light (R1) of FIG. 4 represents a light ray entering the reflection area RA of the LCD from the ambient environment when no electric field is applied to the LC layer 3. The light (R1) is first incident onto the upper polarizer 22. At this time, the upper polarizer 22 transmits only linearly polarized light in the X direction (↔) of the incident light. Next, the linearly polarized light (R1) travels through the upper optical retarder 23. At this time, the upper optical retarder 23 converts the light (R1) into left-handed circularly polarized light. Subsequently, the left-handed circularly polarized light (R1) passes through the LC layer 3, while being converted into linearly polarized light in the Y direction (⊙). Next, the linearly polarized light (R1) rotates 180° by reflection at the reflective electrode 194, but its phase does not change. The light (R1)

reflected by the reflective electrode 194 enters the LC layer 3 again, and is converted into left-handed circularly polarized light. Next, the left-handed circularly polarized light (R1) passes through the upper optical retarder 23, while being converted into linearly polarized light in the X direction (↔). Then, the linearly polarized light (R1) exits the upper polarizer 22, thereby contributing to the display.

Meanwhile, light (R2) represents a light ray entering the reflection area RA of the LCD from the ambient environment when an electric field is applied to the LC layer 3. The light (R2) is first incident onto the upper polarizer 22. At this time, the upper polarizer 22 transmits only linearly polarized light in the X direction (↔) of the incident light. Next, the linearly polarized light (R2) is incident onto the upper optical retarder 23. At this time, the upper optical retarder 23 converts the incident light (R2) into left-handed circularly polarized light. Subsequently, the left-handed circularly polarized light (R2) passes through the LC layer 3 without a change of the polarization state, and is then reflected by the reflective electrode 194. By reflection at the reflective electrode 194, the left-handed circularly polarized light (R2) is converted into right-handed circularly polarized light. The right-handed circularly polarized light (R2) then passes through the LC layer 3 again without a change of the polarization state, and is incident onto the upper optical retarder 23. At this time the upper optical retarder 23 converts the incident light (R2) into linearly polarized light in the Y direction (⊙). Next, the linearly polarized light (R2) enters the upper polarizer 22. At this time, the upper polarizer 22 absorbs the light (R2) since the transmission axis of the polarizer 22 and the polarized direction of the light (R2) are mutually crossed at a right angle. In this case, an LCD screen becomes black.

Hereinafter, proceeding paths of light supplied from the backlight unit 500 will be described.

The light supplied from the backlight unit 500 is first incident onto the lower polarizer 12 whose the transmission axis is in the Y-direction (⊙). At this time, the lower polarizer 12 transmits only a component that is linearly polarized in the Y direction of the incident light and absorbs a component that is linearly polarized in the X direction (↔) that is perpendicular to its transmission axis. In FIG. 4, absorbed light rays are designated as (T3) and (R3) and transmitted light rays are designated as (T4) and (R4). The light rays (T4) and (R4) passing through the lower polarizer 12 enter the lower optical retarder 13 and are then converted into right-handed circularly polarized light rays. Next, the right-handed circularly polarized light rays (T4) and (R4) enter the transmission area TA and the reflection area RA, respectively.

When the right-handed circularly polarized light (R4) impacts the phase-invariant layer 15, it is reflected without a change of the polarization state. Then, the light reflected (R4) passes through the lower optical retarder 13 while being converted into linearly polarized light in the Y direction (⊙). Next, the linearly polarized light (R4) passes through the lower polarizer 12 and is reflected by the reflection plate 510 that is disposed on the lower surface of the backlight unit 500. The reflected light (R4) passes through the lower polarizer 12 again and enters the lower optical retarder 13. At this time, the lower optical retarder 13 converts the linearly polarized incident light (R4) into right-handed circularly polarized light. The above-mentioned sequential steps are repeated once or more, so that the light (R4) enters the transmission area TA and proceeds toward the upper polarizer 22. Accordingly, light efficiency at the transmission area TA is improved and luminance of the LCD operating in a transmission mode is also improved.

The light rays (R4) and (T4) are all right-handed circularly polarized light rays when first entering the transmission area TA. These right-handed circularly polarized light rays (R4) and (T4) proceed along a path of a light ray (T1) or (T2) after entering the transmission area TA so that they contribute to the display. Hereinafter, the light rays (T1) and (T2) will be described.

After entering the transmission area TA, the light rays (T4) and (R4) select one of the light paths of the light rays (T1) and (T2) depending on whether the LC layer 3 is supplied with an electric field or not.

In the case that the LC layer 3 is supplied with no electric field, the light rays (T4) and (R4) proceed along the light path of the light (T1). The right-handed circularly polarized light (T1) enters the LC layer 3. At this time, the LC layer 3 causes a phase retardation of a half wave in the light (T1), so that the light (T1) is converted into left-handed circularly polarized light. Next, the left-handed circularly polarized light (T1) passes through the upper optical retarder 23 and is converted into linearly polarized light in the X direction (↔). Then, the linearly polarized light (T1) exits the upper polarizer 22, thereby contributing to the display.

Meanwhile, in the case that the LC layer 3 is supplied with the electric field, the light rays (T4) and (R4) proceed along the light path of the light (T2). The right-handed circularly polarized light (T2) passes through the LC layer 3. At this time, the LC layer 3 does not change the phase of the light (T2). The right-handed circularly polarized light (T2) then passes through the upper optical retarder 23 and is converted into linearly polarized light in the Y direction (⊙). The linearly polarized light (T2) is absorbed when entering the upper polarizer 22, so that the LCD screen becomes black.

As described above, the phase-invariant layer 15 enables the light (R4) entering the reflection area RA of the LCD from the backlight unit 500 to be transferred to the transmission area TA by reflection, so that light utilization efficiency and luminance of the LCD are improved.

Hereinafter, an LCD according to the second embodiment of the present invention will be described with reference to accompanying drawings.

Figure 5:
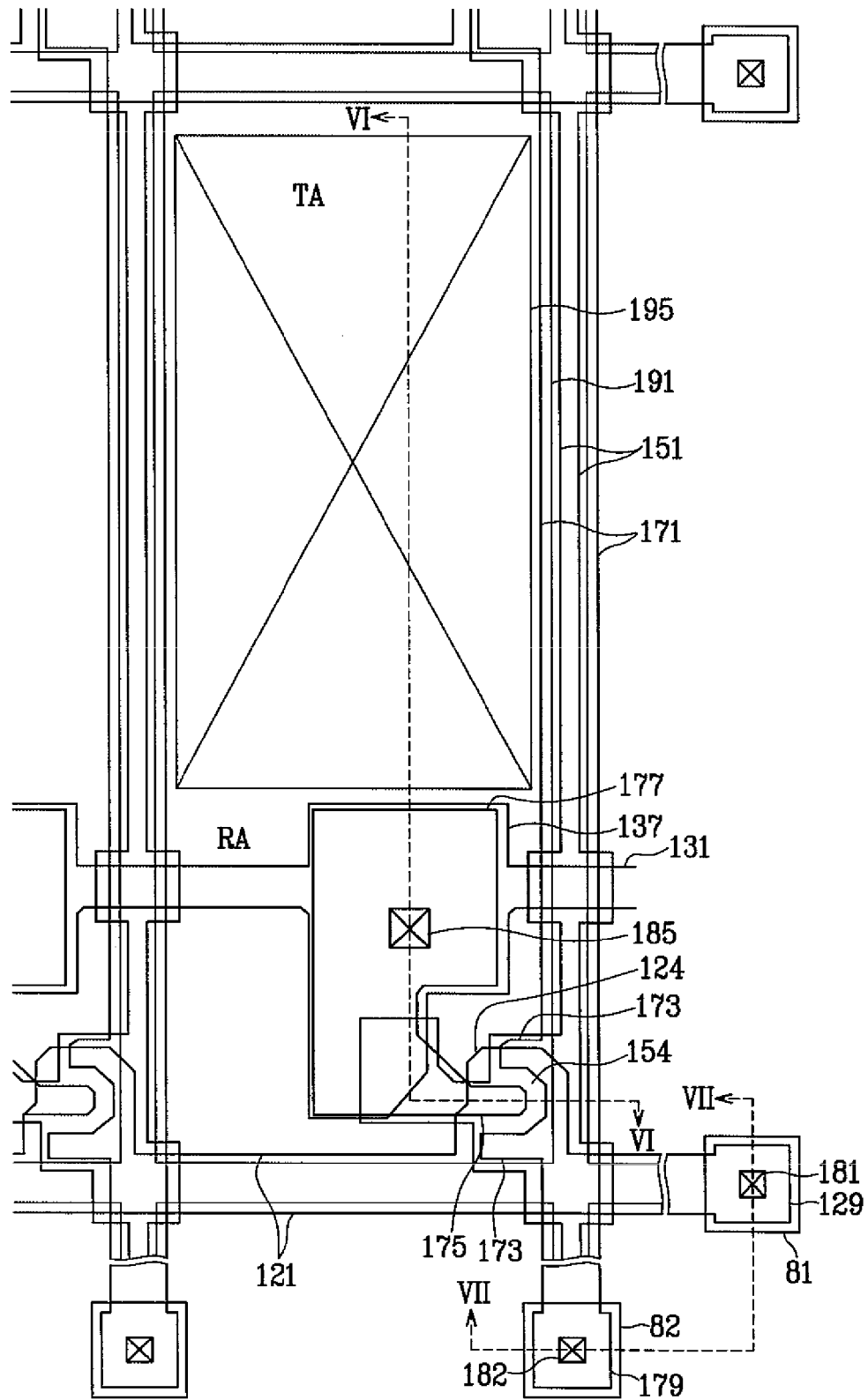
FIG. 5 is a layout view of an LCD according to the second embodiment of the present invention.
Figure 6:
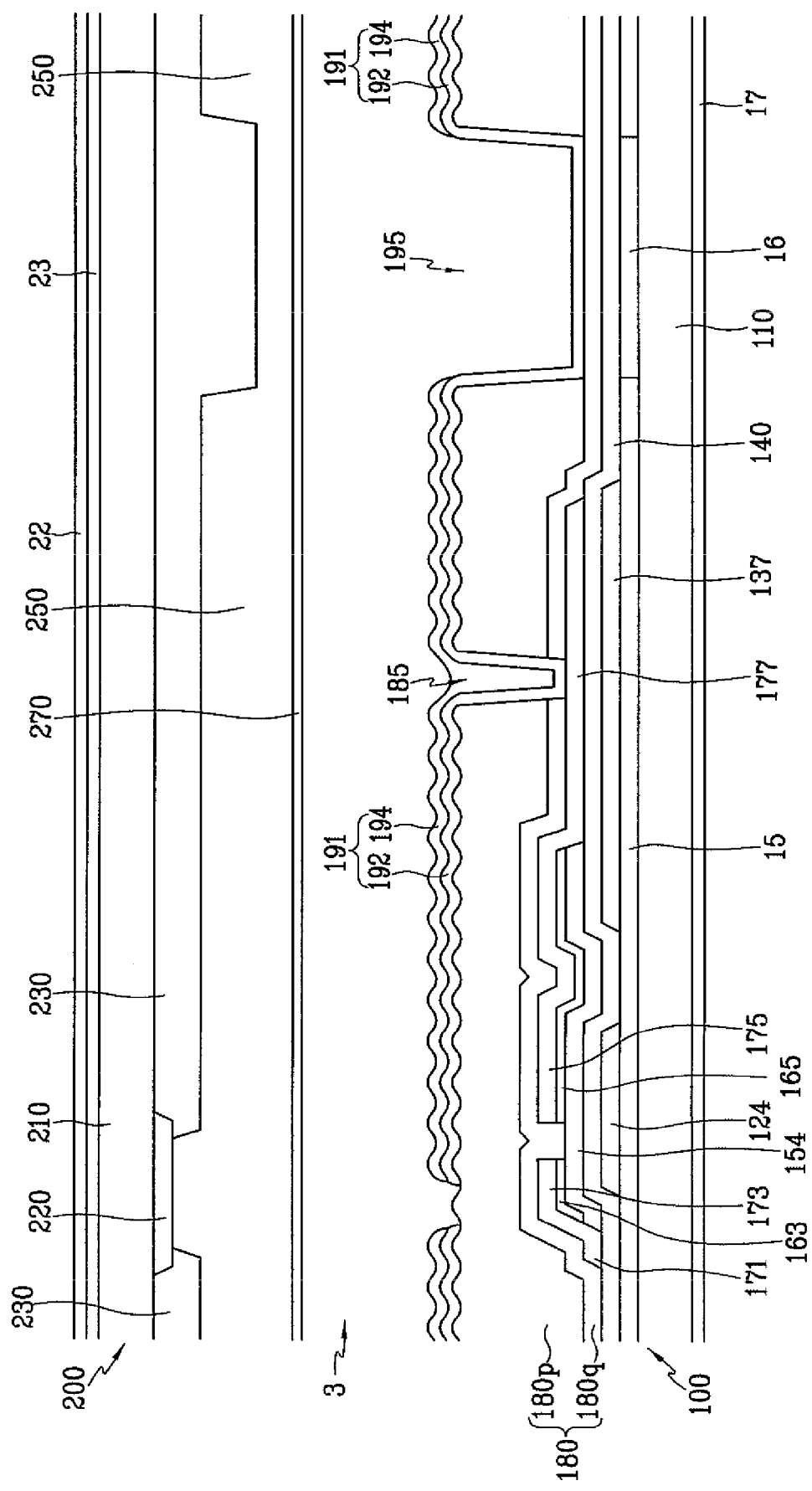
FIG. 6 is a cross-sectional view along a line VI-VI' of FIG. 5.
Figure 7:
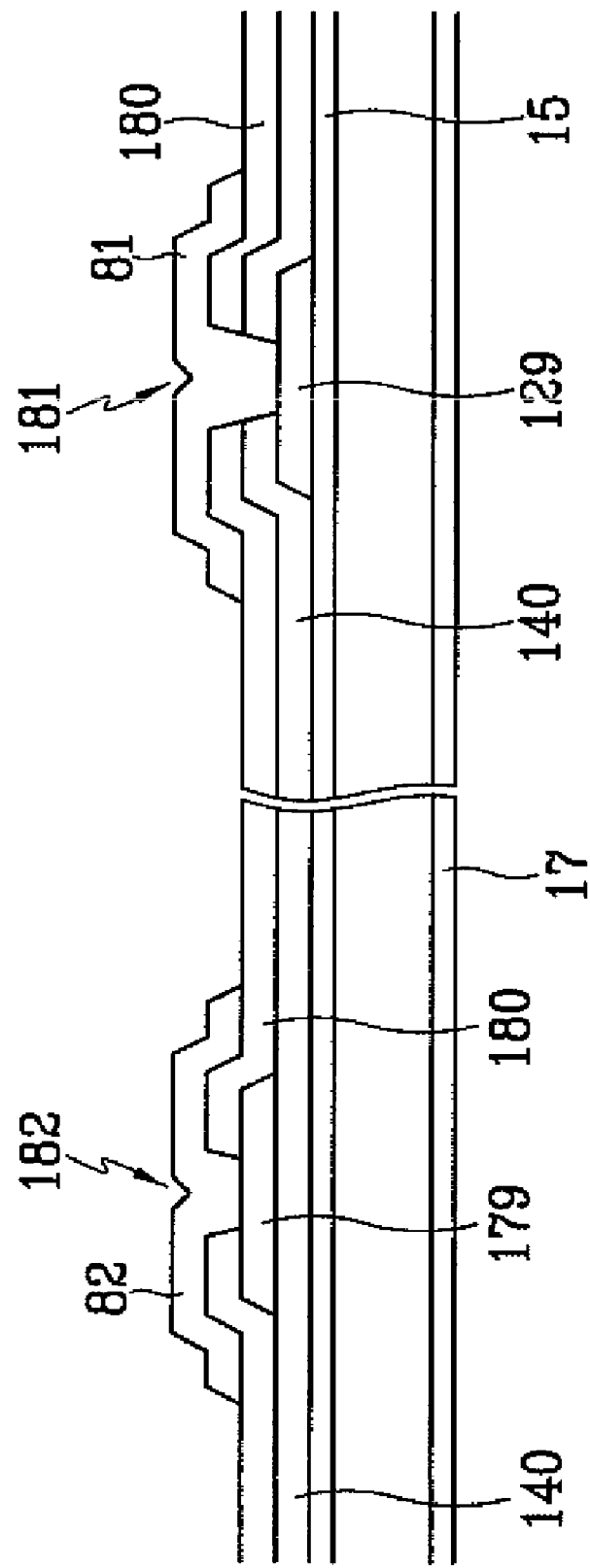
FIG. 7 is a cross-sectional view along a line VII-VII' of FIG. 5.

FIG. 5 is a layout view of an LCD according to the second embodiment of the present invention, and FIG. 6 and FIG. 7 are cross-sectional views along the lines VI-VI' and VII-VII' of FIG. 5, respectively.

Referring to FIG. 5 through FIG. 7, the LCD of this embodiment comprises a TFT array panel 100 and a common electrode panel 200 facing each other, and an LC layer 3 interposed therebetween. LC molecules in the LC layer 3 are aligned perpendicular to or parallel to the surfaces of the two panels 100 and 200.

The TFT array panel 100 is configured as follows.

A phase-invariant layer 15 and an optical isotropy layer 16 are formed on an insulating substrate 110 made of transparent glass or plastic. Here, it is preferably that the phase-invariant layer 15 and the optical isotropy layer 16 are formed at the same layer without an overlap portion therebetween. It is also preferable that the optical isotropy layer 16 is formed at transmission areas TA, while the phase-invariant layer 15 is formed at areas that are not the transmission areas TA, where reflection areas RA are located.

The phase-invariant layer 15 reflects incident light, causing no change in the phase of the light. This phase-invariant layer 15 is formed of cholesteric LC with a helical structure. Based on unique optical characteristics of cholesteric LC, the phase-invariant layer 15 transmits circularly polarized light rotating along the helical structure, while reflecting circularly polarized light rotating in the opposite direction with respect to the helical structure. When reflecting the light, the phase-invariant layer 15 does not change the phase of the light.

Further, when transmitting light, the optical isotropy layer 16 does not change the phase of the light.

In the case that the phase-invariant layer 15 and the optical isotropy layer 16 have different thicknesses from each other, an organic insulating layer (not shown) may be formed on them, for planarization of the two layers.

A plurality of gate lines 121 and a plurality of storage electrode lines 131 are formed on the phase-invariant layer 15 and the optical isotropy layer 16.

The gate lines 121 for transmitting gate signals extend substantially in a horizontal direction. Each gate line 121 includes a plurality of gate electrodes 124 protruding upward and an end portion 129 having a relatively large dimension to be connected to a different layer or an external device. A gate driver (not shown) for generating the gate signals may be mounted on a flexible printed circuit (not shown) attached to the substrate 110, or directly on the substrate 110. Otherwise, the gate driver may be integrated into the substrate 110. In this case, the gate lines 121 are directly connected to the gate driver.

The storage electrode lines 131 for receiving a predetermined voltage extend substantially parallel to the gate lines 121. Each storage electrode line 131 is placed between two adjacent gate lines, particularly, closer to the lower-positioned gate line of the two. Each storage electrode line 131 includes a plurality of storage electrodes 137 protruding upward and downward. The form and arrangement of the storage electrode lines 131 may be freely varied.

The gate lines 121 and the storage electrode lines 131 are preferably made of an aluminum— (Al) containing metal such as Al and an Al alloy, a silver— (Ag) containing metal such as Ag and a Ag alloy, a gold— (Au) containing metal such as Au and a Au alloy, a copper— (Cu) containing metal such as Cu and a Cu alloy, a molybdenum— (Mo) containing metal such as Mo and a Mo alloy, chrome (Cr), titanium (Ti), or tantalum (Ta). The gate lines 121 and the storage electrode lines 131 may be configured as a multi-layered structure, in which at least two conductive layers (not shown) having different physical properties are included. In such a structure, one of the two conductive layers is made of a low resistivity metal, such as an Al-containing metal, a Ag-containing metal, a Cu-containing metal, or the like, in order to reduce delay of the signals or voltage drop in the gate lines 121 and the storage electrode lines 131. The other is made of a material having prominent physical, chemical, and electrical contact properties with other materials such as indium tin oxide (ITO), indium zinc oxide (IZO), etc. For example, a Mo-containing metal, Cr, Ta, Ti, etc., may be used for the formation of the same layer. Desirable examples of the combination of the two layers are a lower Cr layer and an upper Al (or Al alloy) layer, and a lower Al (or Al alloy) layer and an upper Mo (or Mo alloy) layer. Besides the above-listed materials, various metals and conductors can be used for the formation of the gate lines 121 and the storage electrode lines 131.

All lateral sides of the gate lines 121 and the storage electrode lines 131 preferably slope in the range from about 30° to 80° relative to the surface of the substrate 110.

A gate insulating layer 140, made of silicon nitride ($SiN_x$) or silicon oxide ($SiO_x$), is formed on the gate lines 121 and the storage electrode lines 131.

A plurality of linear semiconductors 151 made of hydrogenated amorphous silicon (abbreviated as "a-Si") or polysilicon are formed on the gate insulating layer 140. Each linear semiconductor 151 extends substantially in a vertical direction, and includes a plurality of projections 154 that extend along the respective gate electrodes 124. The linear semiconductors 151 are enlarged in the vicinities of the gate lines 121 and the storage electrode lines 131 to cover them widely.

A plurality of linear ohmic contacts 161 and island-shaped ohmic contacts 165 are formed on the linear semiconductors 151. The ohmic contacts 161 and 165 may be made of N+ hydrogenated amorphous silicon that is highly doped with N-type impurities such as phosphorus (P), or silicide. The linear ohmic contacts 161 include a plurality of projections 163. A set of a projection 163 and an island-shaped ohmic contact 165 is placed on the projection 154 of the semiconductor 151.

All lateral sides of the semiconductors 151 and the ohmic contacts 163 and 165 slope in the range from about 30° to 80° relative to the surface of the substrate 110.

A plurality of data lines 171 and a plurality of drain electrodes 175 are formed on the ohmic contacts 161 and 165 and the gate insulating layer 140.

The data lines 171 for transmitting data signals extend substantially in a vertical direction to be crossed with the gate lines 121 and the storage electrode lines 131. Each data line 171 includes a plurality of source electrodes 173 extending toward the respective gate electrodes 124, and an end portion 179 having a relatively large dimension to be connected to a different layer or an external device. A data driver (not shown) for generating the data signals may be mounted on a flexible printed circuit (not shown) attached to the substrate 110, or directly on the substrate 110. Otherwise, the data driver may be integrated into the substrate 110. In this case, the data lines 171 are directly connected to the gate driver.

The drain electrodes 175 separated from the data lines 171 are opposite to the source electrodes 173, centering on the gate electrodes 124. Each drain electrode 175 includes an expansion 177 having a relatively large dimension and a bar-shaped end portion. The expansions 177 of the drain electrodes 175 are overlapped with the storage electrodes 137 of the storage electrode lines 131, and the bar-shaped end portions are partially surrounded with the curved source electrodes 173.

A gate electrode 124, a source electrode 173, a drain electrode 175, and a projection 154 of the semiconductor 151 form a thin film transistor (TFT). A TFT channel is formed in the projection 154 provided between the source electrode 173 and the drain electrode 175.

The data lines 171 and the drain electrodes 175 are preferably made of a refractory metal such as Mo, Cr, Ta, or Ti, or alloys thereof, and may be configured as multi-layered structures including a refractory metal layer (not shown) and a low resistivity conductive layer (not shown). A desirable example of the multi-layered structure is a lower layer made of one among Cr, Mo, and a Mo alloy, and an upper layer made of Al or an Al alloy. Another example is a lower layer made of Mo or a Mo alloy, an intermediate layer made of Al or an Al alloy, and an upper layer made of Mo or a Mo alloy. Besides the above-listed materials, various metals and conductors can be used for the formation of the data lines 171 and the drain electrodes 175.

All lateral sides of the data lines 171 and the drain electrodes 175 preferably slope in the range from about 30° to 80° relative to the surface of the substrate 110.

The ohmic contacts 161 and 165 exist only between the underlying semiconductors 151 and the overlying data lines 171 and between the overlying drain electrodes 175 and the underlying semiconductors 151, in order to reduce contact resistance therebetween. Most of the linear semiconductors 151 are formed more narrowly than the data lines 171, but portions thereof are enlarged in the vicinities of places to be crossed with the gate lines 121, as previously mentioned, in order to prevent the data lines 171 from being shorted. The linear semiconductors 151 are partially exposed at places where the data lines 171 and the drain electrodes 175 do not cover them, as well as between the source electrodes 173 and the drain electrodes 175.

A passivation layer 180 is formed on the data lines 171, the drain electrodes 175, and the exposed portions of the semiconductors 151. The passivation layer 180 is configured as a double-layered structure including a lower layer 180q made of an inorganic insulator such as SiNx or SiO$_x$, and an upper layer 180p made of an organic insulator. A desirable organic insulator for the upper passivation layer 180p has a low dielectric constant of below 4.0 and/or photosensitivity. The upper passivation layer 180p is provided with apertures 195, i.e., transmission windows, where the lower passivation layer 180q is partially exposed, and the top surface of the upper passivation layer 180p is uneven. The passivation layer 180 may be configured as a single layer of an inorganic insulator or an organic insulator.

The passivation layer 180 is provided with a plurality of contact holes 182 and 185, through which the end portions 179 of the data lines 171 and the drain electrodes 175 are exposed, respectively. A plurality of contact holes 181 are formed in the passivation layer 180 and the gate insulating layer 140, and the end portions 129 of the gate lines 121 are exposed therethrough.

A plurality of pixel electrodes 191 and a plurality of contact assistants 81 and 82 are formed on the passivation layer 180.

Each pixel electrode 191 has a ripple-shaped profile caused by the uneven top surface of the upper passivation layer 180p, and is comprised of a transparent electrode 192 and a reflective electrode 194 overlying the transparent electrode 192. The transparent electrodes 192 are made of a transparent conductor such as ITO or IZO, and the reflective electrodes 194 are made of an opaque reflectivity conductor such as Al, Cr, Ag, or alloys thereof. The reflective electrodes 194 may be configured as a double-layered structure. In this case, upper layers (not shown) are made of a low resistivity metal such as Al, Ag, a Ag alloy, or the like, and lower layers (not shown) are made of a material having prominent contact properties with ITO and IZO, such as a Mo-containing metal, Cr, Ta, Ti, or the like.

Each reflective electrode 194 is formed on a portion of the transparent electrode 192. Accordingly, the remaining portion the transparent electrode 192 is exposed. At this time, the exposed portion of the transparent electrode 192 is disposed to correspond to the transmission window 195 of the upper passivation layer 180p.

The pixel electrodes 191 are physically and electrically connected to the drain electrodes 175 through the contact holes 185 in order to receive data voltages from the drain electrodes 175. The pixel electrodes 191 that are supplied with the data voltages generate electric fields in cooperation with a common electrode 270 of the common electrode panel 200, determining the orientations of the LC molecules in the LC layer 3 interposed between the two electrodes 191 and 270. According to the orientations of the LC molecules, the polarization of light passing through the LC layer 3 is varied. Each set of the pixel electrode 191 and the common electrode 270 forms an LC capacitor that is capable of storing the applied voltage after the TFT is turned off.

In a transflective LCD, there are transmission areas TA defined by the transparent electrodes 192 and reflection areas RA defined by the reflective electrodes 194. In more detail, a transmission area TA is a section of portions disposed on and under the transmission window 195 in the TFT array panel 100, the common electrode panel 200, and the LC layer 3, while a reflection area RA is a section of portions disposed on and under the reflective electrode 194. As illustrated above, the phase-invariant layer 15 is formed at regions that are not the transmission areas TA, while the optical isotropy layer 16 is formed at the transmission areas TA.

In the transmission areas TA, internal light, supplied from a backlight unit 500 that is provided at the rear of the LCD, successively passes through the TFT array panel 100 and the LC layer 3, and then exits the common electrode panel 200, thus contributing to the display. During these processes, the reflective electrodes 194 reflect a portion of light that is supplied from the backlight unit 500, so that such a portion does not reach the common electrode panel 200. In the present invention, however, all light supplied from the backlight unit 500 exits the common electrode panel 200 by virtue of an internal reflection mechanism as will be described in more detail below.

In the reflection areas RA, exterior light, supplied through the front of the LCD, successively passes through the common electrode panel 200 and the LC layer 3, and is then reflected by the reflective electrodes 194 of the TFT array panel 100. After the reflection, the exterior light passes through LC layer 3 again, and then exits the common electrode panel 200, thus contributing to the display. The uneven top surfaces of the reflective electrodes 194 disperse the light by reflection, so that images that may be shown on an LCD screen because of mirror reflection are prevented.

The upper passivation layer 180p does not exist at the transmission areas TA. Therefore, the thickness of the LC layer 3 (i.e., a cell gap) relative to the reflection areas RA is twice as large as the thickness of the LC layer 3 relative to the transmission areas TA.

The pixel electrodes 191 and the drain electrodes 175 connected thereto are overlapped with the storage electrodes 137 as well as stem lines of storage electrode lines 131. To enhance the voltage storage ability of the LC capacitors, storage capacitors are further provided. Overlapping of the pixel electrodes 191 and the drain electrodes 175, electrically connected thereto, with the storage electrode lines 131 implements the storage capacitors.

The contact assistants 81 and 82 are connected to the end portions 129 of the gate lines 121 and the end portions 179 of the data lines 171 through the contact holes 181 and 182, respectively. The contact assistants 81 and 82 supplement adhesion between the exposed end portions 129 and 179 and exterior devices, and protect them.

The common electrode panel 200, facing the TFT array panel 100, is configured as follows.

A light-blocking member 220 called "a black matrix" is provided on an insulating substrate 210 made of transparent glass or plastic. The light-blocking member 220 prevents light from leaking out through barriers between the pixel electrodes 190, and defines aperture regions facing the pixel electrodes 191.

A plurality of color filters 230 are formed on the substrate 210. Most of them are placed within the aperture regions delimited by the light-blocking member 220. The color filters 230 may extend along the respective pixel electrodes 191 in a vertical direction. Each color filter 220 may exhibit one among red, green, and blue colors.

Portions of the color filters 230 that are placed at the transmission areas TA and portions of the color filter 230 that are placed at the reflection areas RA are differently formed in their thicknesses. In general, the transflective LCD exhibits a difference of color tone between the transmission area TA and the reflection area RA. This is because in the transmission areas TA light passing through the transparent electrodes 192 passes through the color filters 230 only once, while in the reflection areas RA light that is incident through the common electrode panel 200 passes through the color filters twice because of reflection at the reflective electrodes 194. To compensate the difference of color tone, some methods have been used. One method is to form the portions of the color filters 230, which are placed at the transmission areas TA, more thickly than the portions of the color filter 230, which are placed at the reflection areas RA. Another method is to form light holes in the color filters 230 that are placed at the reflection areas RA.

An overcoat layer 250 is formed on the light-blocking member 220 and the color filters 230 to remove a step difference occurring between the color filters 230 and the light-blocking member 220.

The common electrode 270, made of a transparent conductive material such as ITO or IZO, is formed on the overcoat layer 250.

Two alignment layers (not shown) are individually formed on the inner surfaces of the two panels 100 and 200 to align the LC molecules in the LC layer 3 in a desired direction.

A selective reflection layer 17 is disposed on the outer surface of the lower insulating substrate 110, and an upper optical retarder 23 and an upper polarizer 22 in that order are disposed on the outer surface of the upper insulating substrate 210.

A transmission axis of the upper polarizer 22 is in the X direction (↔).

The upper optical retarder 23, which is provided between the upper polarizer 22 and the upper substrate 210, has a slow axis and a fast axis. Accordingly, light passing through the fast axis obtains a faster phase than that of light passing through the slow axis. In this embodiment, a phase difference between the two axes is a quarter-wave to convert circularly polarized light into linearly polarized light or linearly polarized light into circularly polarized light. At this time, it is preferable that the two axes are perpendicular to each other and that they are formed at ±45° to the transmission axis of the upper polarizer 22, respectively.

The selective reflection layer 17, which is disposed on the outer surface of the lower insulating substrate 110, transmits only circularly polarized light rotating in a specific direction and reflects circularly polarized light rotating in the opposite direction. When reflecting the light, the selective reflection layer 17 does not change the phase of the light.

The selective reflection layer 17 and the phase-invariant layer 15 are both formed of cholesteric LC, but they have helical structures rotating in different directions from each other. Accordingly, circularly polarized light reflected by the selective reflection layer 17 and circularly polarized light reflected by the phase-invariant layer 15 rotate in opposite directions to one another. In more detail, the selective reflection layer 17 transmits right-handed circularly polarized light and reflects left-handed circularly polarized light, while the phase-invariant layer 15 transmits left-handed circularly polarized light and reflects right-handed circularly polarized light.

The LC molecules in the LC layer 3 are aligned perpendicular to or parallel to the surfaces of the panels 100 and 200.

A plurality of spacers (not shown) are provided between the two panels 100 and 200 to maintain a uniform cell gap between the two panels 100 and 200 where the LC layer 3 is eventually placed.

To assemble the TFT array panel 100 and the common electrode panel 200, a sealant (not shown) may be applied to the edges of the common electrode panel 200.

Figure 8:
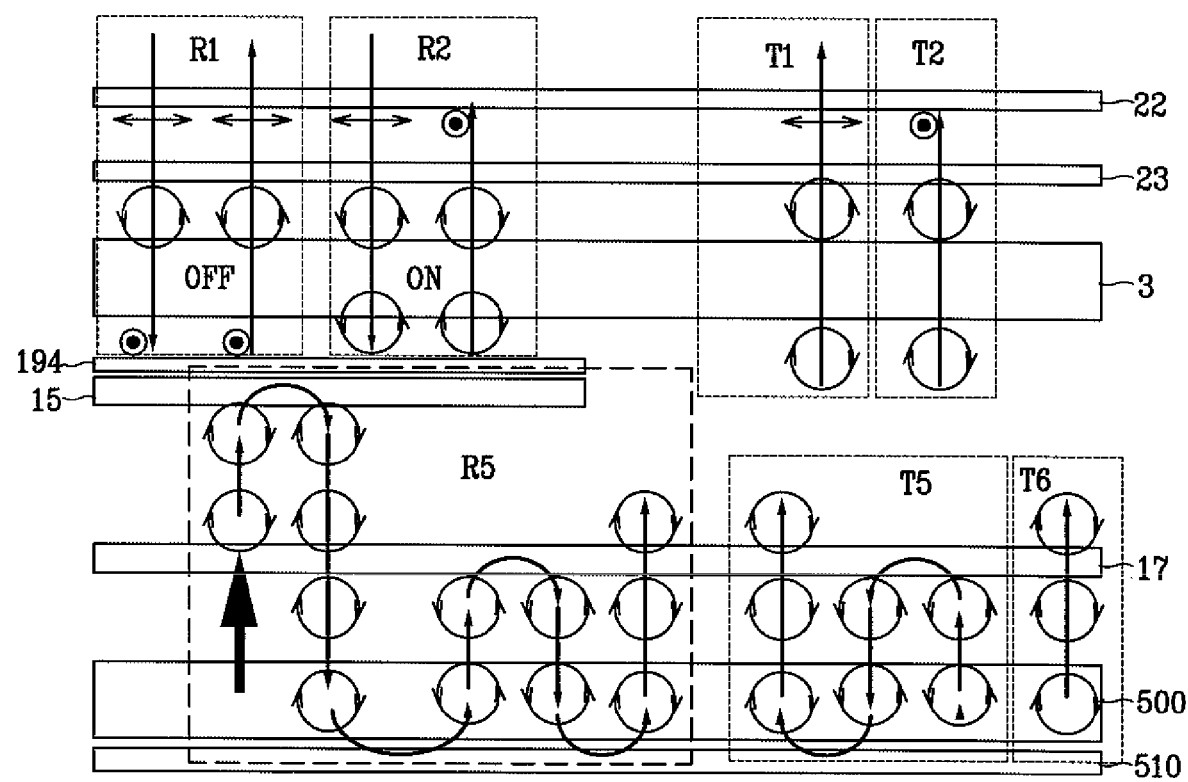
FIG. 8 shows the polarization states of light at a reflection area and a transmission area of the LCD shown in FIG. 5 through FIG. 7.

FIG. 8 shows the polarization states of light at the reflection area RA and the transmission area TA of the LCD shown in FIG. 5 through FIG. 7.

In FIG. 8, the LCD and the backlight unit 500 as an internal light source are simply illustrated. A reflection plate 510 is provided on a lower surface of the backlight unit 500.

FIG. 8 shows only primary components that have influence on the polarization of light in the LCD. As those components, there are the upper polarizer 22, the upper optical retarder 23, the LC layer 3, the phase-invariant layer 15, and the selective reflection layer 17. The optical isotropy layer 16 is omitted in FIG. 8 since it does not affect the polarization state of light passing therethrough.

The transmission axis of the upper polarizer 22 is in the X direction (↔), as mentioned in the above. The polarizer 22 is an absorbing polarizer that transmits a component parallel to its transmission axis and absorbs a component perpendicular to the axis.

The upper optical retarder 23 has the slow axis and the fast axis. Accordingly, light passing through the fast axis obtains a faster phase than that of light passing through the slow axis. In this embodiment, a phase difference between the two axes is a quarter-wave to convert circularly polarized light into linearly polarized light or linearly polarized light into circularly polarized light. At this time, it is preferable that the two axes are mutually crossed at a right angle and that they are formed at ±45° to the transmission axis of the upper polarizer 22, respectively.

The selective reflection layer 17 and the phase-invariant layer 15 are both formed of cholesteric LC with the helical structure. Based on unique optical characteristics of cholesteric LC, the selective reflection layer 17 and the phase-invariant layer 15 transmit circularly polarized light rotating along their helical structures, and reflect circularly polarized light rotating in the opposite direction to the structures. When reflecting light, they do not change the phase of the light. However, the helical structures of the selective reflection layer 17 and the phase-invariant layer 15 rotate in different directions from each other. Accordingly, circularly polarized light reflected by the selective reflection layer 17 and circularly polarized light reflected by the phase-invariant layer 15 rotate in opposite directions to one another. In more detail, the selective reflection layer 17 transmits only right-handed circularly polarized light and reflects left-handed circularly polarized light, while the phase-invariant layer 15 transmits only left-handed circularly polarized light and reflects right-handed circularly polarized light.

Depending on whether the LC layer 3 is supplied with an electric field or not, the polarization state of light passing through the LC layer 3 is maintained or changed. That is, the LC layer 3 without the electric field influences the polarization state of light passing therethrough, while the LC layer 3 with the electric field does not influence the polarization state. In the latter case, since the thickness of the LC layer 3 that is placed at the reflection area RA is half of the thickness of the LC layer 3 placed at the transmission area TA, a phase difference at the reflection area RA becomes a quarter-wave, while it is a half-wave at the transmission area TA. Accordingly, in the reflection area RA, the LC layer 3 without the electric field converts linearly polarized incident light into circularly polarized light and vice versa, while in the transmission area TA the LC layer 3 converts right-handed circularly polarized incident light into left-handed circularly polarized light and vice versa.

Based on the above-mentioned facts, proceeding paths of light entering the reflection area RA will be discussed below with reference to FIG. 8.

Light (R1) of FIG. 4 represents a light ray entering the reflection area RA of the LCD from the ambient environment when no electric field is applied to the LC layer 3. The light (R1) is first incident onto the upper polarizer 22. At this time, the upper polarizer 22 transmits only linearly polarized light in the X direction (↔) of the incident light. Next, the linearly polarized light (R1) travels through the upper optical retarder 23. At this time, the upper optical retarder 23 converts the light (R1) into left-handed circularly polarized light. Subsequently, the left-handed circularly polarized light (R1) passes through the LC layer 3 while being converted into linearly polarized light in the Y direction (⊙). Next, the linearly polarized light (R1) rotates 180° by reflection at the reflective electrode 194, but its polarization state does not change. The light (R1) reflected by the reflective electrode 194 enters the LC layer 3 again, and is converted into left-handed circularly polarized light. Next, the left-handed circularly polarized light (R1) passes through the upper optical retarder 23, while being converted into linearly polarized light in the X direction (↔). Then, the linearly polarized light (R1) exits the upper polarizer 22, thereby contributing to the display.

Meanwhile, light (R2) represents a light ray entering the reflection area RA of the LCD from the ambient environment when an electric field is applied to the LC layer 3. The light (R2) is first incident onto the upper polarizer 22. At this time, the upper polarizer 22 transmits only linearly polarized light in the X direction (↔) of the incident light. Next, the linearly polarized light (R2) is incident onto the upper optical retarder 23. At this time, the upper optical retarder 23 converts the incident light (R2) into left-handed circularly polarized light. Subsequently, the left-handed circularly polarized light (R2) passes through the LC layer 3 without a change of the polarization state, and is then reflected by the reflective electrode 194. By reflection at the reflective electrode 194, the left-handed circularly polarized light (R2) is converted into right-handed circularly polarized light. The right-handed circularly polarized light (R2) then passes through the LC layer 3 again without a change of the polarization state, and is incident onto the upper optical retarder 23. At this time, the upper optical retarder 23 converts the incident light (R2) into linearly polarized light in the Y direction (⊙). Next, the linearly polarized light (R2) enters the upper polarizer 22, which absorbs the light (R2) since the transmission axis of the polarizer 22 and the polarized direction of the light (R2) are mutually crossed at a right angle. In this case, an LCD screen becomes black.

Hereinafter, proceeding paths of light supplied from the backlight unit 500 will be described.

The light supplied from the backlight unit 500 is incident onto the selective reflection layer 17. At this time, the selective reflection layer 17 only transmits right-handed circularly polarized light and reflects left-handed circularly polarized light. Hereinafter, the left-handed circularly polarized light and the right-handed circularly polarized light, supplied from the backlight unit 500, will be referred to as (T5) and (T6), respectively.

When the left-handed circularly polarized light (T5), emitted from the backlight unit 500, is incident onto the selective reflection layer 17, the selective reflection layer 17 reflects the light (T5). The reflected light (T5) is reflected again when meeting a reflection plate 510 that is disposed under the backlight unit 500, while being converted into right-handed circularly polarized light. Then, the right-handed circularly polarized light (T5) passes through the selective reflection layer 17.

Meanwhile, when the right-handed circularly polarized light (T6) that is emitted from the backlight unit 500 is incident onto the selective reflection layer 17, the selective reflection layer 17 transmits the light (T6) intact.

Finally, all of the light (T5) and the light (T6), emitted from the backlight unit 500, are incident onto an LCD panel assembly. At this time, they are all right-handed circularly polarized light rays.

Hereinafter, sequential processes in which right-handed circularly polarized light entering the reflection area RA of the LCD from the backlight unit 500 is transferred to the transmission area TA will be described. This light is designated as (R5) in FIG. 8.

The right-handed circularly polarized light (R5), entering the reflection area RA of the LCD from the backlight unit 500, is incident onto the phase-invariant layer 15 after passing through the selective reflection layer 17. At this time, the phase-invariant layer 15 reflects the incident light (R5), causing no change in its polarization state. The right-handed circularly polarized light reflected (R5) then enters the selective reflection layer 17 again. At this time, the selective reflection layer 17 passes the incident light (R5) through intact. Subsequently, the right-handed circularly polarized light (R5) is converted into left-handed circularly polarized light by reflection at the reflection plate 510 of the backlight unit 500. Then, the left-handed circularly polarized light (R5) is reflected again when meeting the selective reflection layer 17 and is incident onto the reflection plate 510 again. At this time, the reflection plate 510 reflects the light (R5), converting the light (R5) into right-handed circularly polarized light. Next, the right-handed circularly polarized light (R5) passes through the selective reflection layer 17 and proceeds upward. The right-handed circularly polarized light (R5), originally emitted from the backlight unit 500, undergoes the above-mentioned successive processes once or more, thereby entering the transmission area TA. In this way, the light (R5) entering the reflection area RA of the LCD from the backlight unit 500 is transferred to the transmission area TA, so that light efficiency and luminance of the LCD are improved.

The light rays (R5), (T5), and (T6) are all the right-handed circularly polarized light rays when first entering the transmission area TA. These right-handed circularly polarized light rays (R5), (T5), and (T6) proceed along a path of a light ray (T1) or (T2) after entering the transmission area TA so that they contribute to the display. Hereinafter, the light rays (T1) and (T2) will be described.

After entering the transmission area TA, the light rays (R5), (T5), and (T6) select one of the light paths of the light rays (T1) and (T2) depending on whether the LC layer 3 is supplied with an electric field or not.

In the case that the LC layer 3 is supplied with no electric field, the light rays (R5), (T5), and (T6) proceed along the light path of the light (T1). The right-handed circularly polarized light (T1) enters the LC layer 3. At this time, the LC layer 3 causes a phase retardation of a half wave in the light (T1), so that the light (T1) is converted into left-handed circularly polarized light. Next, the left-handed circularly polarized light (T1) passes the upper optical retarder 23, while being converted into linearly polarized light in the X direction (↔). Then, the linearly polarized light (T1) exits the upper polarizer 22, thereby contributing to the display.

Meanwhile, in the case that the LC layer 3 is supplied with the electric field, the light rays (R5), (T5), and (T6) proceed along the light path of the light (T2). The right-handed circularly polarized light (T2) enters the LC layer 3. At this time, the LC layer 3 causes no phase retardation in the light (T2). The right-handed circularly polarized light (T2) then passes through the upper optical retarder 23, while being converted into linearly polarized light in the Y direction (☉). The linearly polarized light (T1) is absorbed when entering the upper polarizer 22, so that the LCD screen becomes black.

As described above, the phase-invariant layer 15 enables the light (R5) entering the reflection area RA of the LCD from the backlight unit 500 to enter the transmission area TA by reflection, so that light efficiency and luminance of the LCD are improved.

In the first embodiment shown in FIG. 1 through FIG. 4, the linearly polarized component in the X direction (↔) of the light that is supplied from the backlight unit 500 is removed by absorption at the lower polarizer 12. On the other hand, in this embodiment, all light supplied from the backlight unit 500 is used for the display, so that light utilization efficiency of the LCD is improved.

Hereinafter, manufacturing methods of the phase-invariant layer 15 and the selective reflection layer 17 will be described.

In this embodiment, both of the phase-invariant layer 15 and the selective reflection layer 17 are formed on the lower insulating substrate 210 and are formed of cholesteric LC. However, cholesteric LC used for the phase-invariant layer 15 and cholesteric LC used for the selective reflection layer 17 rotate in opposite directions to each other. Besides this one distinction, the phase-invariant layer 15 and the selective reflection layer 17 are nearly identical. Accordingly, only a manufacturing method of the phase-invariant layer 15 will be discussed below.

FIG. 9 through FIG. 12 are schematic cross-sectional views showing process steps to manufacture the phase-invariant layer 15 according to one embodiment of the present invention.

The phase-invariant layer 15 is manufactured as follows.

Figure 9:
FIG. 9 through FIG. 12 are schematic cross-sectional views showing process steps to manufacture a phase-invariant layer according to one embodiment of the present invention.

An alignment layer 15-1 is first formed on the lower insulating substrate 110, as shown in FIG. 9. In this step, a rubbing process for the alignment layer 15-1 is not required. This alignment layer 15-1 may be a horizontal alignment layer or a vertical alignment layer.

Figure 10:
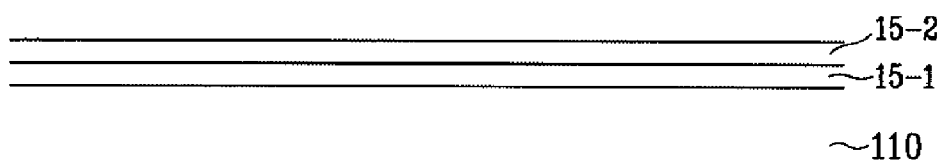

Next, a cholesteric LC material 15-2 containing an ultraviolet (UV) cross-linking agent is coated on the alignment layer 5-1, as shown in FIG. 10.

Figure 11:
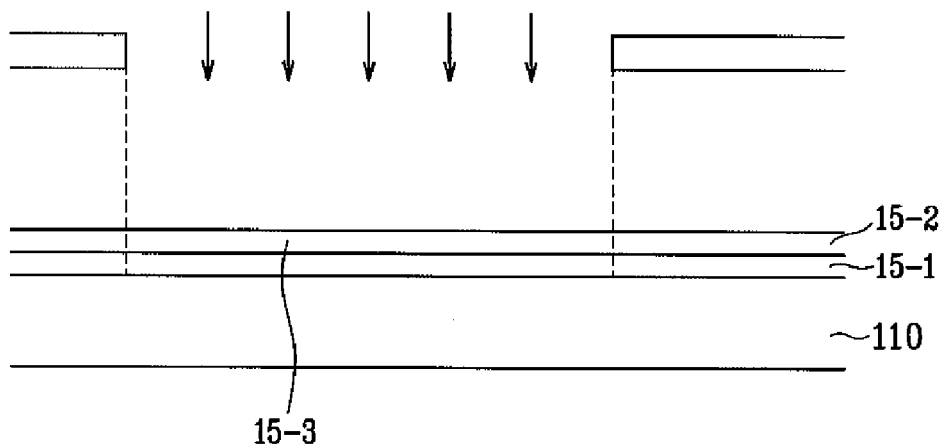

Subsequently, UV irradiation is applied to the resultant of FIG. 10 through a mask, as shown in FIG. 11. In this step, only the area that is not a transmission area TA is exposed to UV rays. Accordingly, only the cholesteric LC material of the exposed area is cured, so a cholesteric LC layer 15-3 is formed at that area. A molecular pitch of the cholesteric LC layer 15-3, i.e., a twisted distance of the cholesteric LC layer 15-3, preferably changes depending on where it is placed within the layer 15-3.

Cholesteric LC exhibits a twisted structure where each LC molecule is helically twisted about an axis. Accordingly, cholesteric LC transmits only circularly polarized light rotating along the twisted structure and reflects circularly polarized light rotating in the opposite direction. In other words, cholesteric LC carries out selective reflection and selective transmission for circularly polarized incident light. When reflecting light, cholesteric LC does not cause any change in the polarization state of the light.

Practically, however, cholesteric LC can not transmit and reflect all visible light, and transmits and reflects only wavelengths that lie in the range satisfying the following equation:

$$n_0 \times P < \lambda < n_e \times P \quad \text{(Equation 1)}$$

where $n_0$ is an ordinary refractive index, $n_e$ is an extraordinary refractive index, and P is the pitch of the molecular helix of cholesteric LC.

It is ideal that all visible light is included in the range defined by Equation 1, but practically, a portion of the visible light is not included in the range. Accordingly, a problem may occur in that the portion of the visible light that is not included in the range defined by Equation 1 passes through the cholesteric LC intact because it lies outside the parameters of the selective reflection and transmission by cholesteric LC. In this case, a desirable method that is capable of solving such a problem is to diversely vary the pitch (P) of the molecular helix in a layer of cholesteric LC. The pitch (P) can vary depending on conditions of the UV irradiation. Hereinafter, the selective reflection and transmission, which are carried out for the entire visible light spectrum will be referred to as wide-band selective reflection and transmission, and the phase-invariant layer 15 performing the wide-band selective reflection and transmission will be referred to as a wide-band phase-invariant layer.

Figure 12:
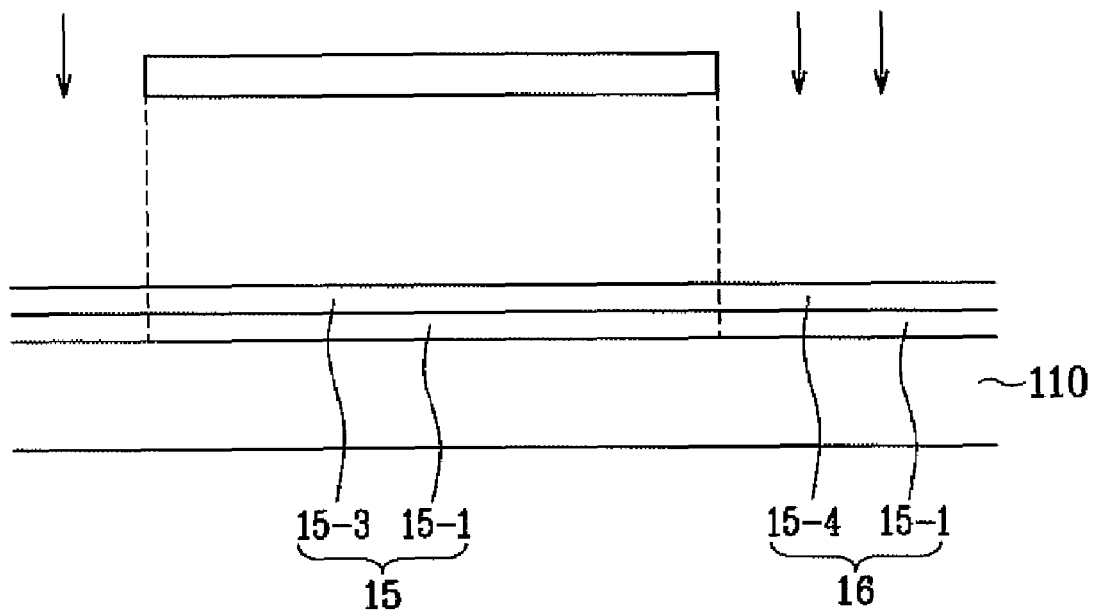

After forming the cholesteric LC layer 15-3 as shown in FIG. 11, UV irradiation is applied through a mask only to the transmission area TA, as shown in FIG. 12. Accordingly, the cholesteric LC material of the transmission area TA is cured and a cholesteric LC layer 15-4 is formed there. This step is performed at a higher temperature so that the cholesteric LC layer 15-4 has an optical isotropy characteristic.

As a result, a phase-invariant layer 15 consisting of the alignment layer 15-1 and the cholesteric LC layer 15-3, and an optical isotropy layer 16 consisting of the alignment layer 15-1 and the cholesteric LC layer 15-4, are completed.

The selective reflection layer 17 can be produced through the successive process steps shown in FIG. 9 through FIG. 11. However, no mask is used in the UV irradiation step shown in FIG. 11. Therefore, the entire area is exposed to UV rays and is cured. The pitch (P) of the molecular helix of cholesteric LC may be variously formed depending on conditions of the UV irradiation. Accordingly, if the conditions of the UV irradiation are applied differently to some portions of the cholesteric LC layer, a wide-band selective reflection layer that is capable of performing the selective reflection and transmission for all visible light is produced.

Figure 13:
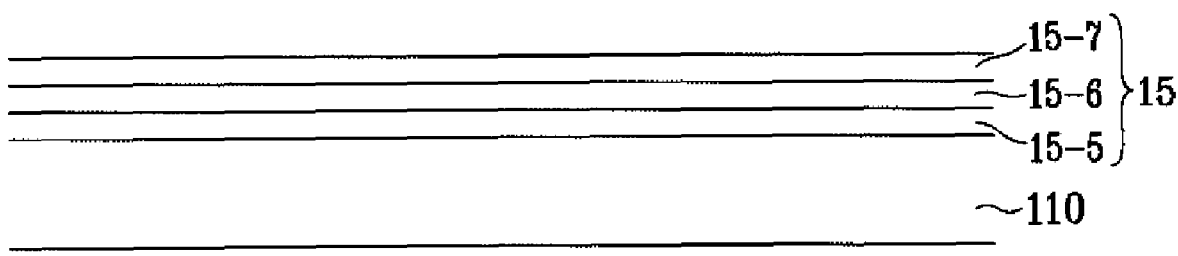
FIG. 13 shows a phase-invariant layer according to an alternate embodiment of the present invention.

FIG. 13 shows a phase-invariant layer according to an alternate embodiment of the present invention.

The method, previously described with reference to FIG. 9 through FIG. 12, is to form the wide-band phase-invariant layer 15 of which the molecular pitch is diversely varied depending on the molecular position. However, the phase-invariant layer 15 of this embodiment is configured as a multi-layered structure including two or more layers, each of which allows only light rays having wavelengths within a specific range to pass or reflect. In more detail, the phase-invariant layer 15 has a triple-layered structure, in which a lower layer 15-5, an intermediate layer 15-6, and an upper layer 15-7 are included as shown in FIG. 13. Each of the layers 15-5, 15-6, and 15-7 reflects circularly polarized components rotating in a specific direction of red light, green light, and blue light, and transmits circularly polarized components rotating in the opposite direction of those lights. Each of the layers 15-5, 15-6, and 15-7 has a fixed pitch of the molecular helix. For this reason, each of the layers 15-5, 15-6, and 15-7 can transmit and reflect only light having wavelengths within a range relative to the pitch. The layers 15-5, 15-6, and 15-7 can be individually obtained through the process steps shown in FIG. 9 through FIG. 11. In the case that the phase-invariant layer 15 and the optical isotropy layer 16 have the different thicknesses, an organic insulating layer may be formed thereon to compensate a step difference occurring at a boundary between the phase-invariant layer 15 and the optical isotropy layer 16 and to offer a flat surface to layers that will be laminated above these two layers.

The selective reflection layer 17 may also be configured as a multi-layered structure, similarly to the phase-invariant layer 15.

In the above-mentioned embodiments, the phase-invariant layer 15 and the optical isotropy layer 16 are formed at the same layer without any overlap portion therebetween. In other embodiments, it is possible that only the phase-invariant layer 15 is formed at the areas that are not the transmission areas TA and that the optical isotropy layer 16 is omitted. Alternately, the optical isotropy layer 16 may be formed over the entire area.

Meanwhile, in the embodiments of the present invention, the phase-invariant layer 15 and the optical isotropy layer 16 are formed on the inner surface of the lower insulating substrate 110, but they may be formed on the outer surface of the substrate 110. Otherwise, the phase-invariant layer 15 may be formed between the passivation layer 180 and the reflective electrode 194.

As described above, the phase-invariant layer, which is formed at the areas that are not the transmission areas TA, forces light entering the reflection areas of the LCD from the backlight unit to move into the transmission areas by reflection so that the amount of light used in a transmission mode is increased. Also, light utilization efficiency and display luminance of the LCD are improved.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

What is claimed is:

1. A display device including a transmission area and a reflection area, comprising:
    a first substrate;
    a phase-invariant layer that is formed on the first substrate and reflects light, causing no change in the polarization state of the light;
    a transparent electrode formed on the first substrate;
    a reflective electrode formed on a portion of the transparent electrode;
    a second substrate that is opposite to the first substrate;
    a liquid crystal layer interposed between the first substrate and the second substrate;
    a first optical retarder and a second optical retarder, each being attached to a respective outer surface of the first and second substrates; and
    a first polarizer and a second polarizer, each being attached to a respective outer surface of the first and second optical retarders,
    wherein the reflection area comprises an area disposed on and under the reflective electrode and the transmission area comprises an area disposed on and under the partial transparent electrode without the reflective electrode thereon, and
    wherein the phase-invariant layer is formed at the reflection area.

2. The display device of claim 1, wherein the phase-invariant layer is formed of cholesteric liquid crystal.

3. The display device of claim 2, wherein the phase-invariant layer comprises a wide-band cholesteric liquid crystal layer in which the pitch of the molecular helix varies with its position along the phase-invariant layer.

4. The display device of claim 2, wherein the phase-invariant layer comprises a multi-layered structure including at least two cholesteric liquid crystal layers each having an uniform pitch.

5. The display device of claim 4, wherein the phase-invariant layer comprises a triple-layered structure including three cholesteric liquid crystal layers each having an uniform pitch, the three cholesteric liquid crystal layers selectively reflecting and transmitting red light, green light, and blue light, respectively.

6. The display device of claim 1, wherein the first polarizer and the second polarizer have transmission axes that are mutually crossed at a right angle.

7. The display device of claim 6, wherein each of the first optical retarder and the second optical retarder has a slow axis and a fast axis that are formed at ±45° to the transmission axes of the first and second polarizers.

8. The display device of claim 1, wherein each of the first optical retarder and the second optical retarder is a quarter-wave phase retardation film.

9. The display device of claim 1, further comprising an optical isotropy layer that is formed at the same layer as the phase-invariant layer without an overlap portion between the optical isotropy layer and the phase-invariant layer.

10. The display device of claim 1, further comprising a backlight unit that is provided under the first substrate to supply light to the display device.

11. The display device of claim 1, further comprising a reflection plate that is disposed on a lower surface of the backlight unit.

12. A display device including a transmission area and a reflection area, comprising:
    a first substrate;
    a phase-invariant layer that is formed on the first substrate and reflects light, causing no change in the polarization state of the light;
    a transparent electrode formed on the first substrate;
    a reflective electrode formed on a portion of the transparent electrode;
    a second substrate that is opposite to the first substrate;
    a liquid crystal layer interposed between the first substrate and the second substrate;
    an optical retarder that is attached to the outer surface of the second substrate;
    a polarizer that is attached to the outer surface of the optical retarder; and
    a selective reflection layer that is attached to the outer surface of the first substrate and transmits a component that is polarized in a first direction of incident light, while reflecting a component that is polarized in a second direction, which is opposite to the first direction,
    wherein the reflection area comprises an area disposed on and under the reflective electrode, and the transmission area comprises an area disposed on and under the partial transparent electrode without the reflective electrode thereon, and
    wherein the phase-invariant layer is formed at the reflection area.

13. The display device of claim 12, wherein the phase-invariant layer is formed of cholesteric liquid crystal.

14. The display device of claim 13, wherein the phase-invariant layer comprises a wide-band cholesteric liquid crystal layer in which the pitch of the molecular helix varies with its position along the phase-invariant layer.

15. The display device of claim 13, wherein the phase-invariant layer comprises a multi-layered structure including at least two cholesteric liquid crystal layers each having an uniform pitch.

16. The display device of claim 15, wherein the phase-invariant layer comprises a triple-layered structure in which three cholesteric liquid crystal layers each having an uniform molecular pitch, the three cholesteric liquid crystal layers selectively reflecting and transmitting red light, green light, and blue light, respectively.

17. The display device of claim 12, wherein the polarizer has a transmission axis and the optical retarder has a fast axis and a slow axis that are formed at ±45° to the transmission axis of the polarizer.

18. The display device of claim 12, wherein the optical retarder is a quarter-wave phase retardation film.

19. The display device of claim 12, further comprising an optical isotropy layer that is formed at the same layer as the phase-invariant layer without an overlap portion therebetween.

20. The display device of claim 12, further comprising a backlight unit that is provided under the first substrate to supply light to the liquid crystal display.

21. The display device of claim 20, further comprising a reflection plate that is disposed on a lower surface of the backlight unit.

22. The display device of claim 12, wherein the selective reflection layer is formed of cholesteric liquid crystal.

23. The display device of claim 22, wherein the selective reflection layer comprises a wide-band cholesteric liquid crystal layer in which the pitch of the molecular helix varies with its position along the selective reflection layer.

24. The display device of claim 22, wherein the selective reflection layer comprises a multi-layered structure including at least two cholesteric liquid crystal layers each having an uniform pitch.

25. The display device of claim 24, wherein the selective reflection layer comprises a triple-layered structure including three cholesteric liquid crystal layers each having an uniform pitch, each of the cholesteric liquid crystal layers selectively reflecting and transmitting red light, green light, and blue light, respectively.

26. A display device including a transmission area and a reflection area, comprising:
a first substrate;
a phase-invariant layer that is formed on the first substrate and reflects light that is polarized in a first direction, causing no change in the polarization state of the light;
a transparent electrode formed on the first substrate;
a reflective electrode formed on a portion of the transparent electrode;
a second substrate that is opposite to the first substrate;
a liquid crystal layer interposed between the first substrate and the second substrate;
a first optical retarder that is attached to the outer surface of the second substrate; and
a first polarizer that is attached to the outer surface of the optical retarder,
wherein the reflection area comprises an area disposed on and under the reflective electrode and the transmission area comprises an area disposed on and under the partial transparent electrode without the reflective electrode thereon, and
wherein the phase-invariant layer is formed at the reflection area and is supplied with light that is polarized in the first direction.

27. The display device of claim 26, further comprising a second optical retarder and a second polarizer that are attached to the outer surface of the first substrate in that order and that enable the light polarized in the specific direction to be incident onto the phase-invariant layer.

28. The display device of claim 26, further comprising a selective reflection layer, attached to the outer surface of the first substrate, that transmits a component of light that is polarized in the first direction of incident light and that reflects a component of light that is polarized in a second direction.

29. The display device of claim 26, further comprising an optical isotropy layer that is formed at the same layer as the phase-invariant layer without an overlap portion between the optical isotropy layer and the phase-invariant layer.

30. The display device of claim 26, wherein the phase-invariant layer is formed of cholesteric liquid crystal.

31. The display device of claim 26, wherein the phase-invariant layer comprises a wide-band cholesteric liquid crystal layer in which the pitch of molecular helix varies with its position along the phase-invariant layer.

32. The display device of claim 30, wherein the phase-invariant layer comprises a multi-layered structure including at least two cholesteric liquid crystal layers each having uniform pitch.

33. The display device of claim 32, wherein the phase-invariant layer comprises a triple-layered structure including three cholesteric liquid crystal layers each having uniform pitch, the three cholesteric liquid crystal layers selectively reflecting and transmitting red light, green light, and blue light, respectively.

* * * * *